US007516041B2

(12) United States Patent
Smartt et al.

(10) Patent No.: US 7,516,041 B2
(45) Date of Patent: Apr. 7, 2009

(54) SYSTEM AND METHOD FOR IDENTIFYING ROAD FEATURES

(75) Inventors: Brian Smartt, Sunnyvale, CA (US); Craig Weisenfluh, Menlo Park, CA (US)

(73) Assignee: Dash Navigation, Inc., Sunnyvale, CA (US)

( * ) Notice: Subject to any disclaimer, the term of this patent is extended or adjusted under 35 U.S.C. 154(b) by 0 days.

(21) Appl. No.: 11/581,808

(22) Filed: Oct. 16, 2006

(65) Prior Publication Data

US 2007/0129892 A1    Jun. 7, 2007

Related U.S. Application Data

(60) Provisional application No. 60/726,894, filed on Oct. 14, 2005.

(51) Int. Cl.
*G01V 3/38* (2006.01)

(52) U.S. Cl. .................................................... 702/167

(58) Field of Classification Search .................. 702/167
See application file for complete search history.

(56) References Cited

OTHER PUBLICATIONS

Xiaoying Jin and Curt H. Davis, An integrated system for automatic road mapping from high-resolution multi-spectral satellite imagery by information fusion, Jul. 19, 2004, p. 257-273.*
Written Opinion of the International Searching Authority, Aug. 22, 2008, 3 pages.
International Search Report, Aug. 22, 2008, 2 pages.
\* cited by examiner

*Primary Examiner*—Tung S Lau
(74) *Attorney, Agent, or Firm*—Charles Gotlieb; Innovation Partners

(57) ABSTRACT

A system and method identifies road features that may not appear on a map database, such as paths not described as roads on the map database, and whether all the roads at a crossing cross at the same grade level. The system and method may thus be used to identify points of departure from, or points of merging onto, a road described by the map database or a path identified as described herein, but not described by the map database.

7 Claims, 31 Drawing Sheets

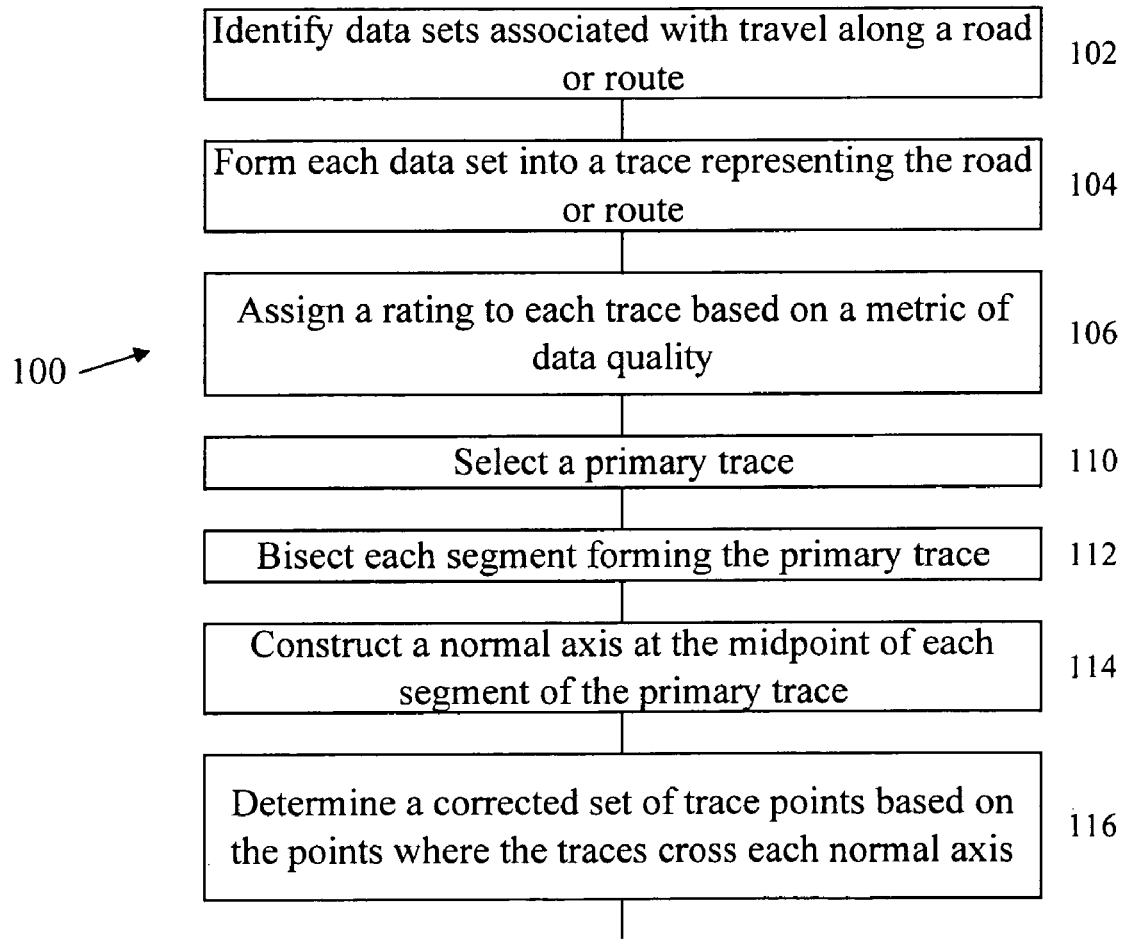
FIG.-A1

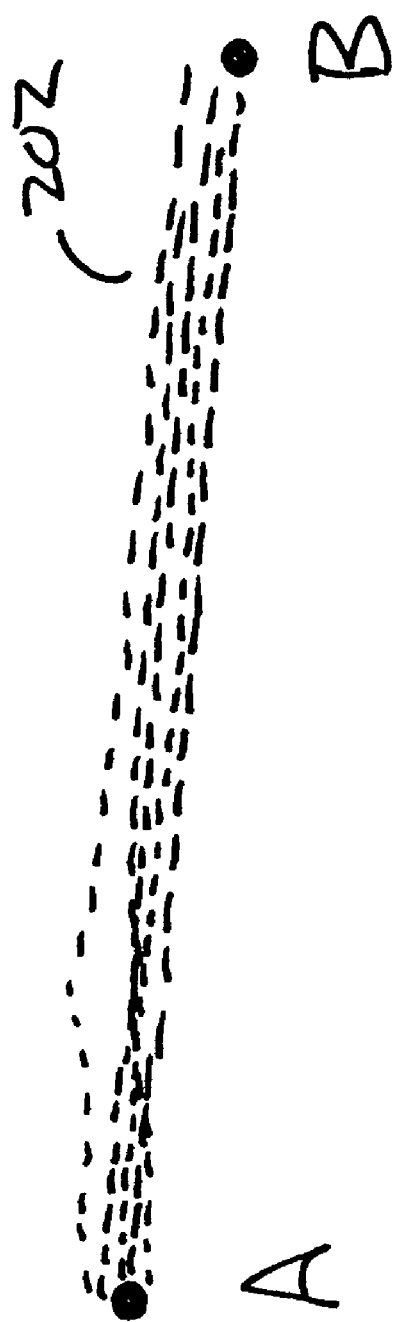
FIG. A2

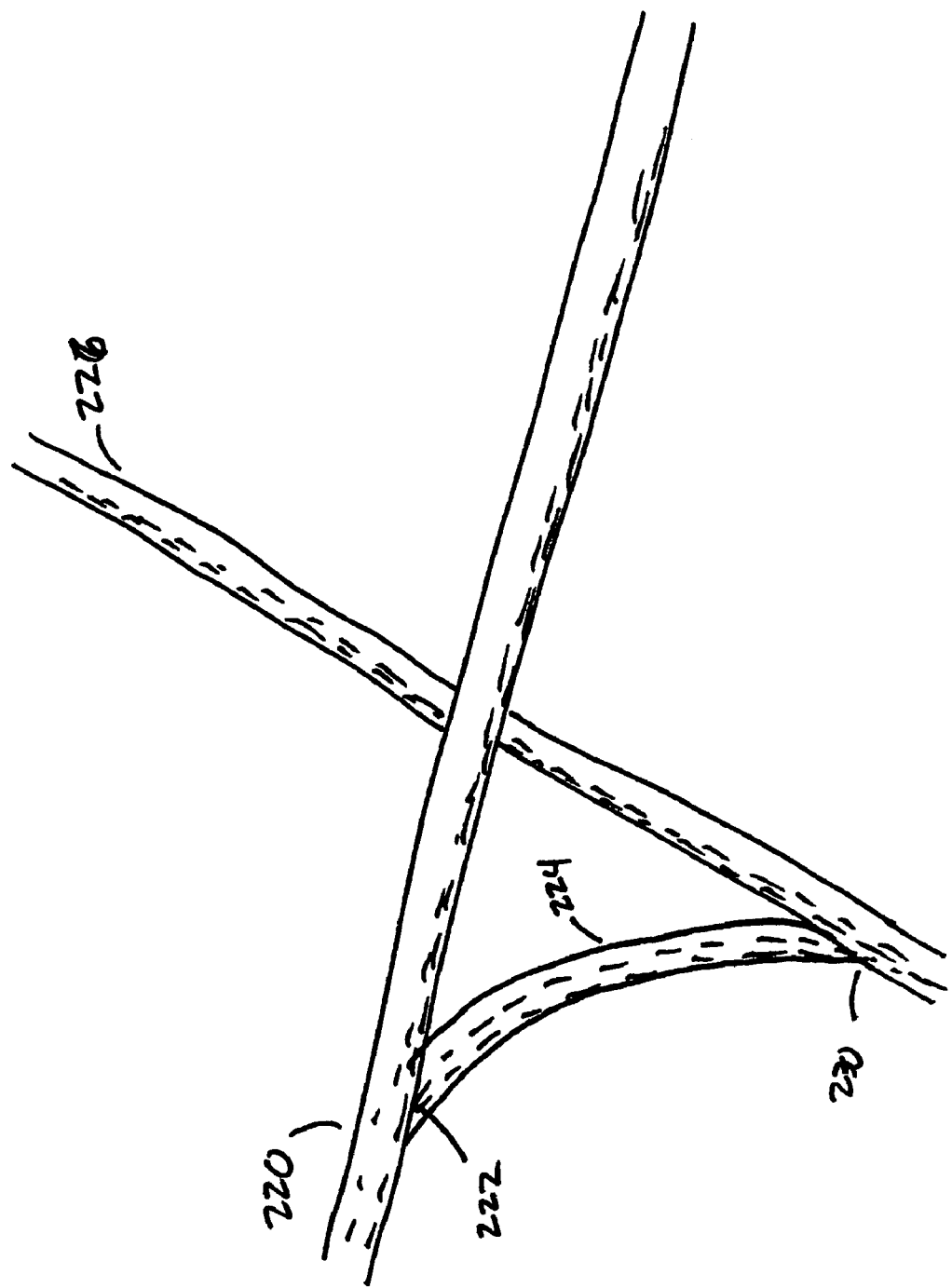
FIG. A3

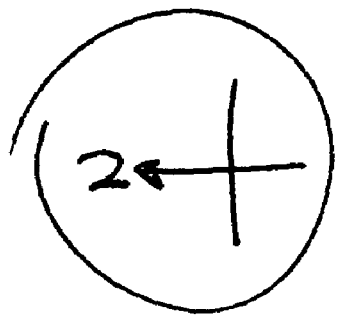
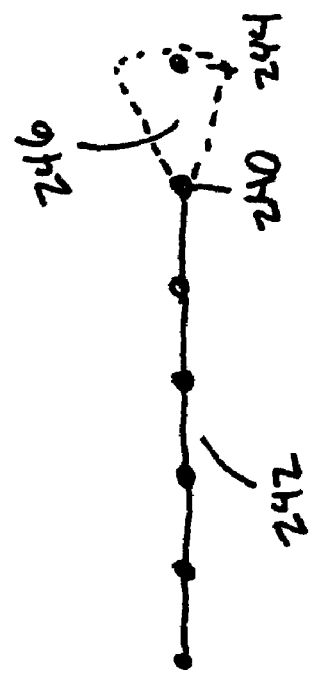
FIG. A4

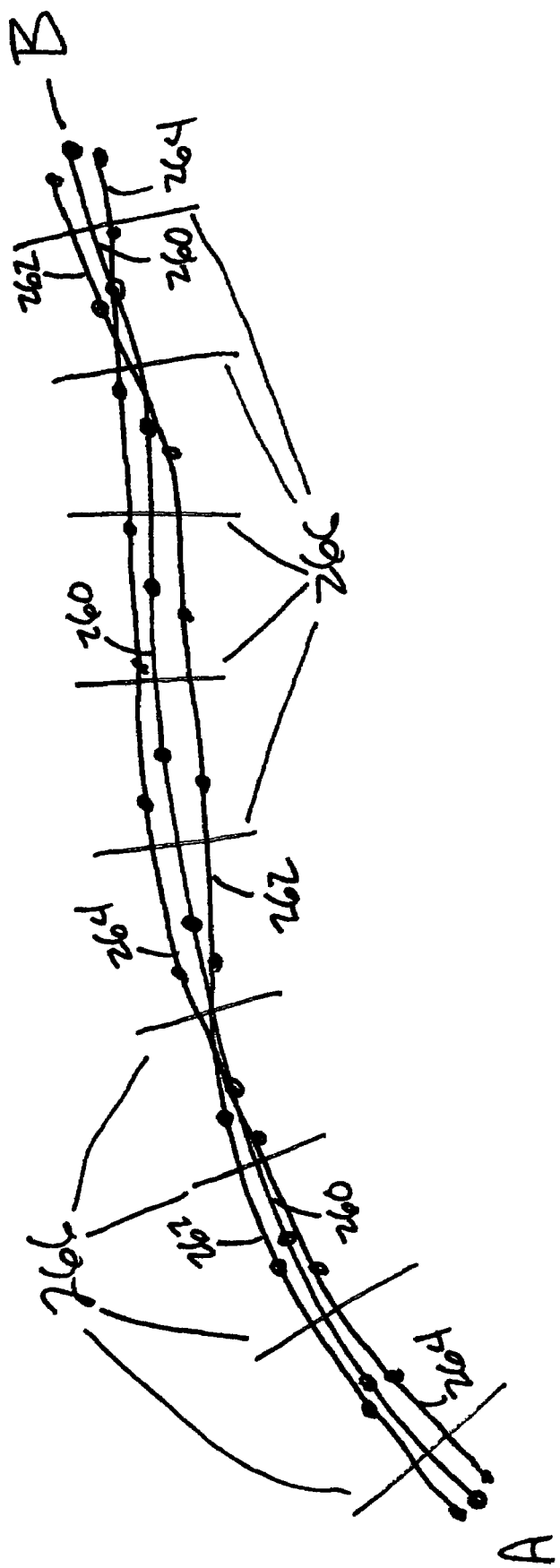
FIG. A5

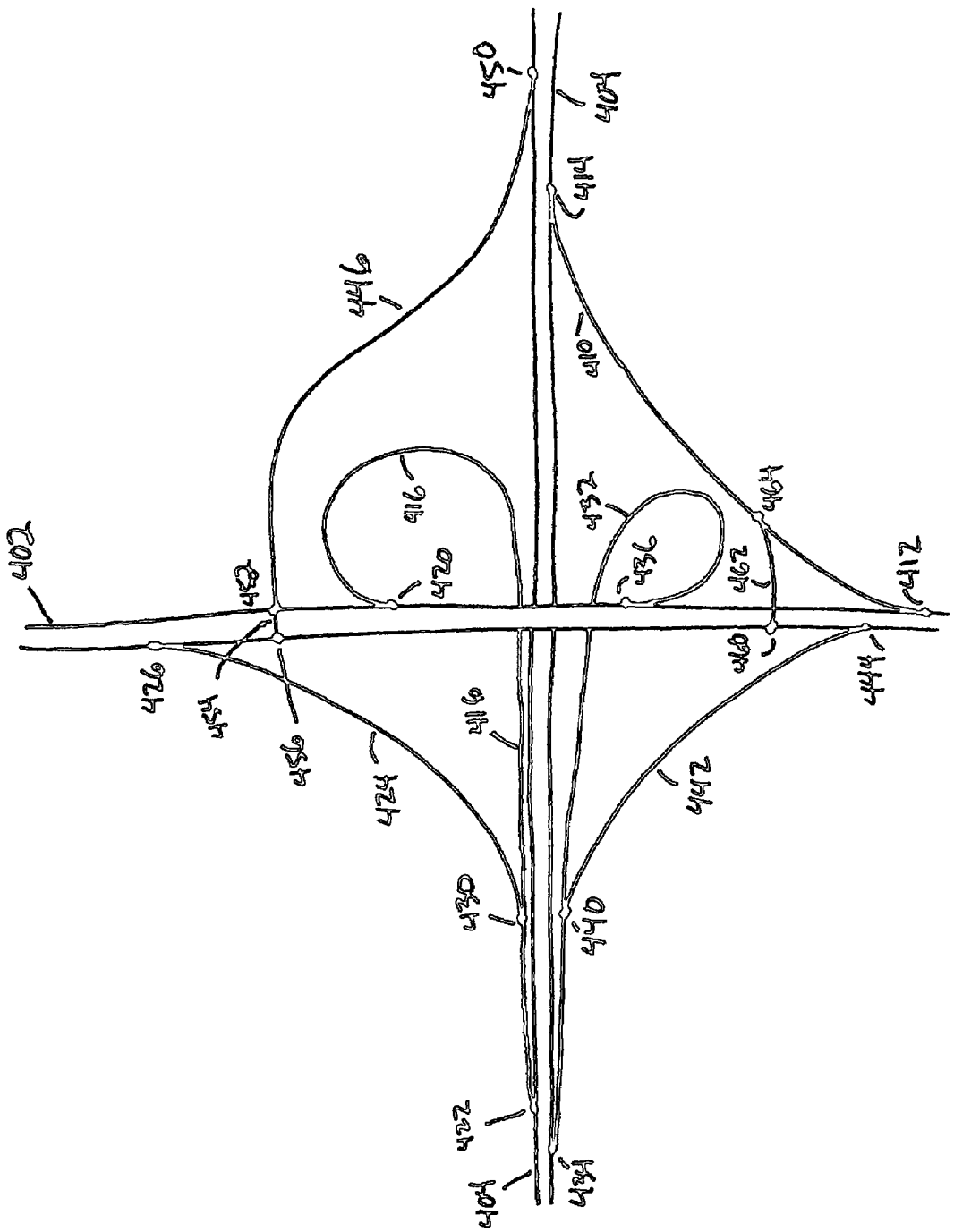
FIG. B1

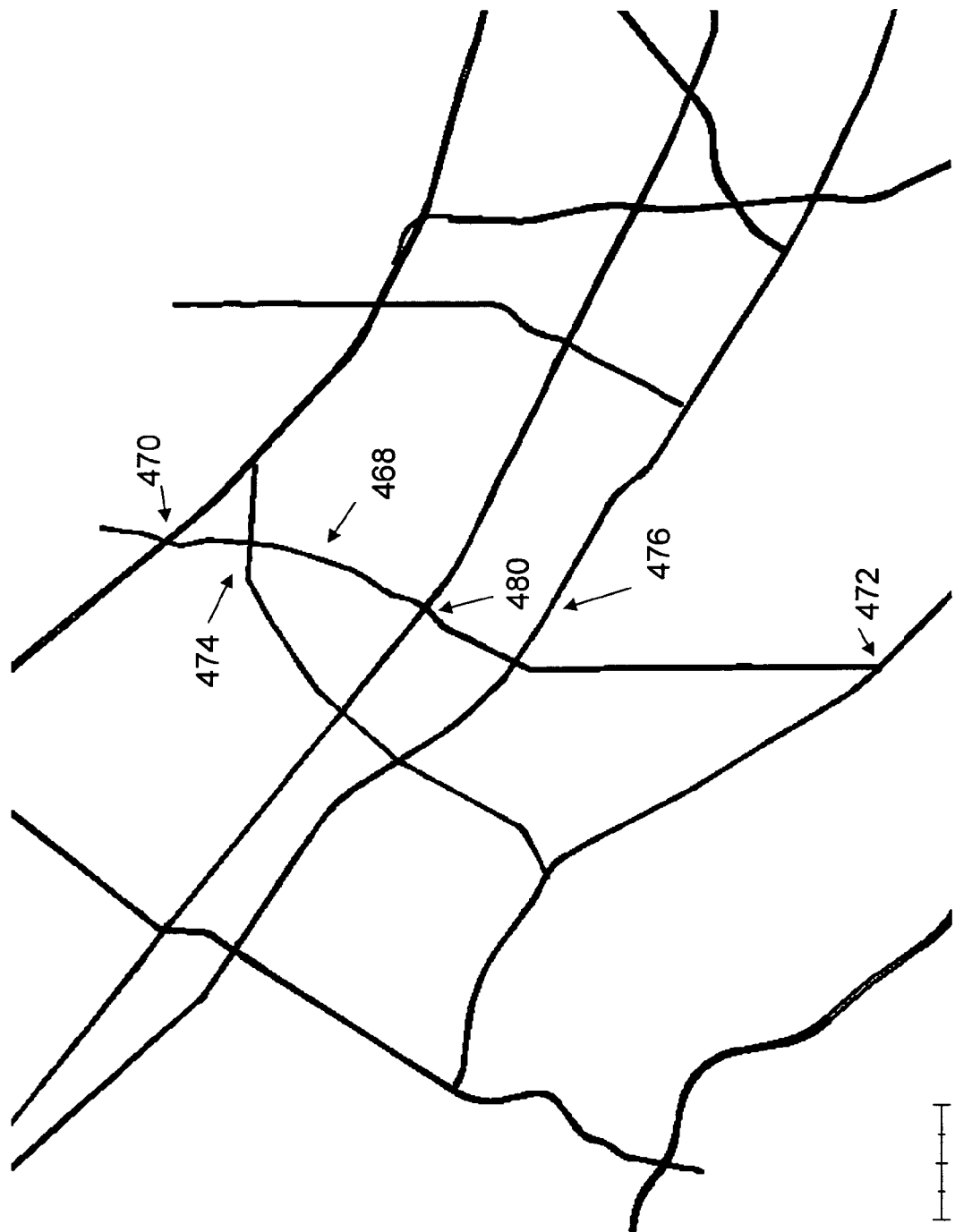
FIG.-B2

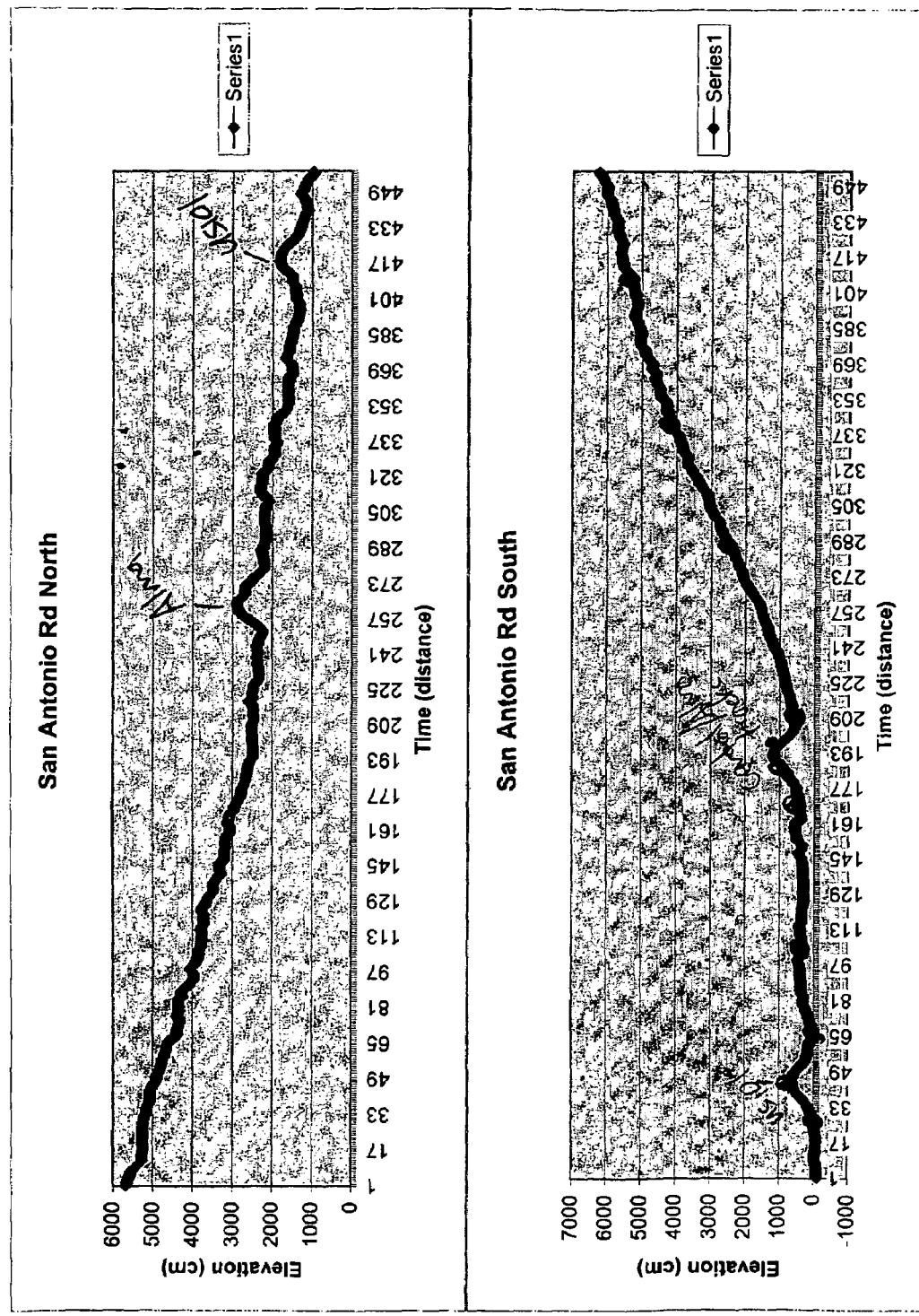
FIG. B3

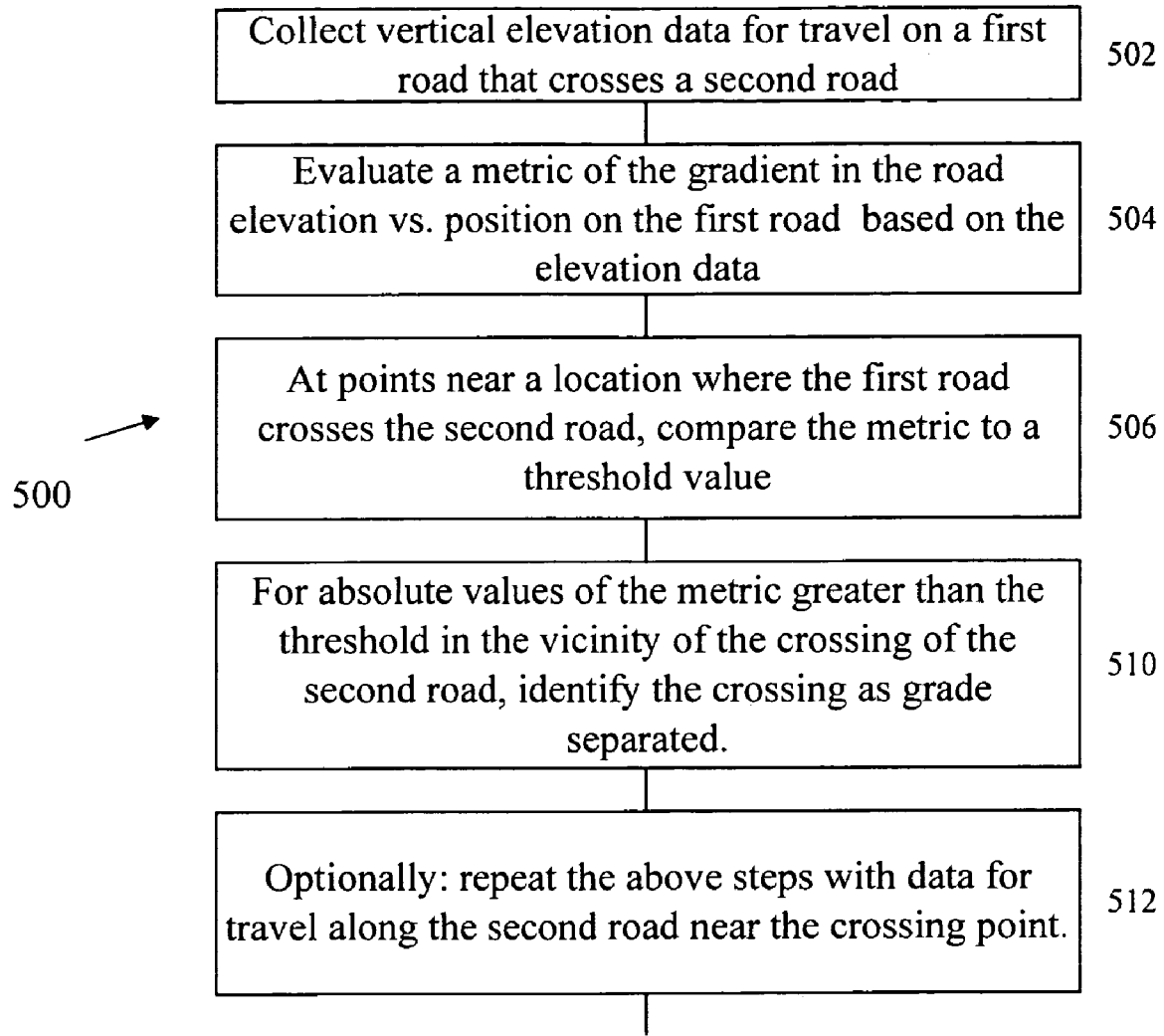
FIG.-B4

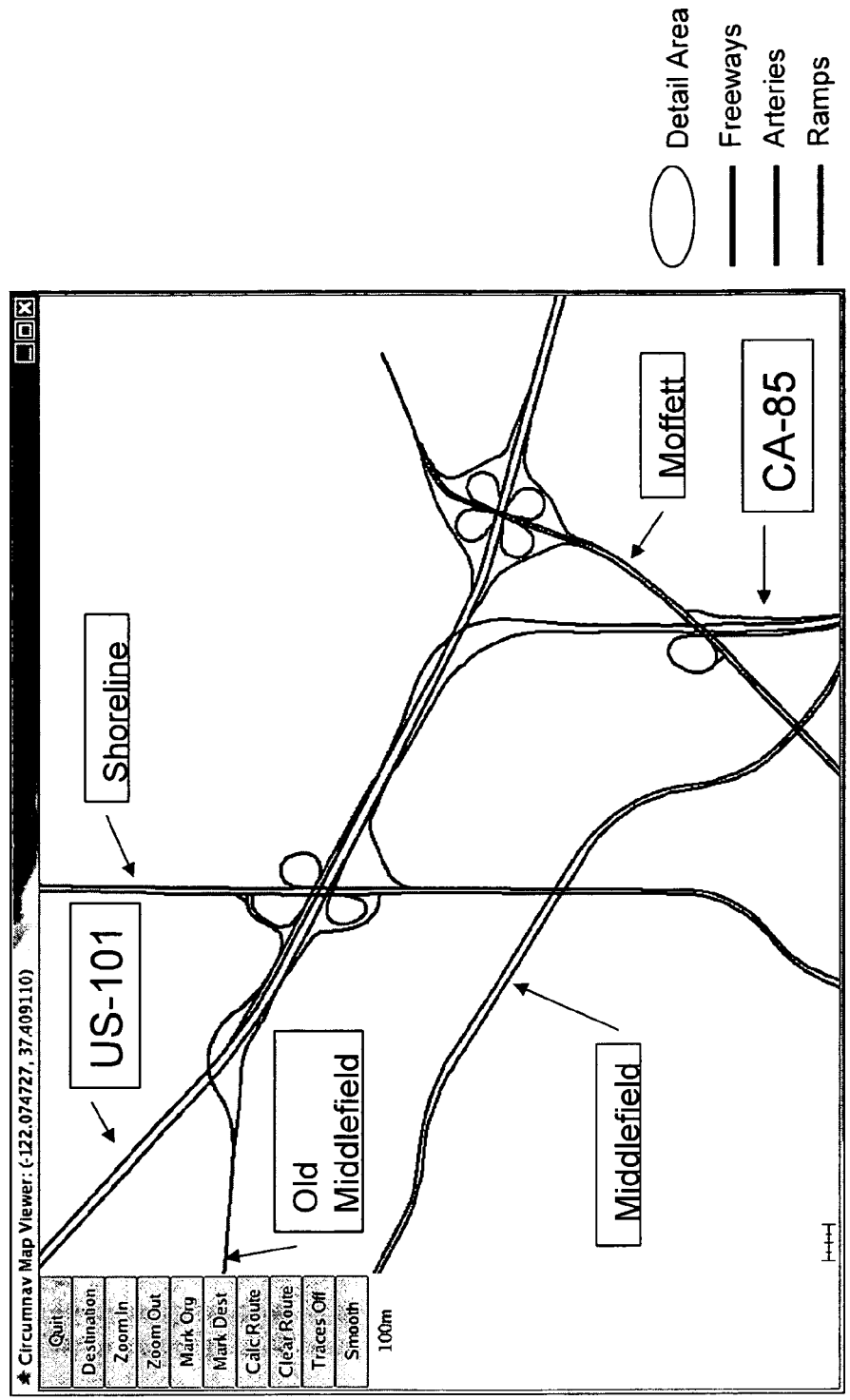
FIG.-C1

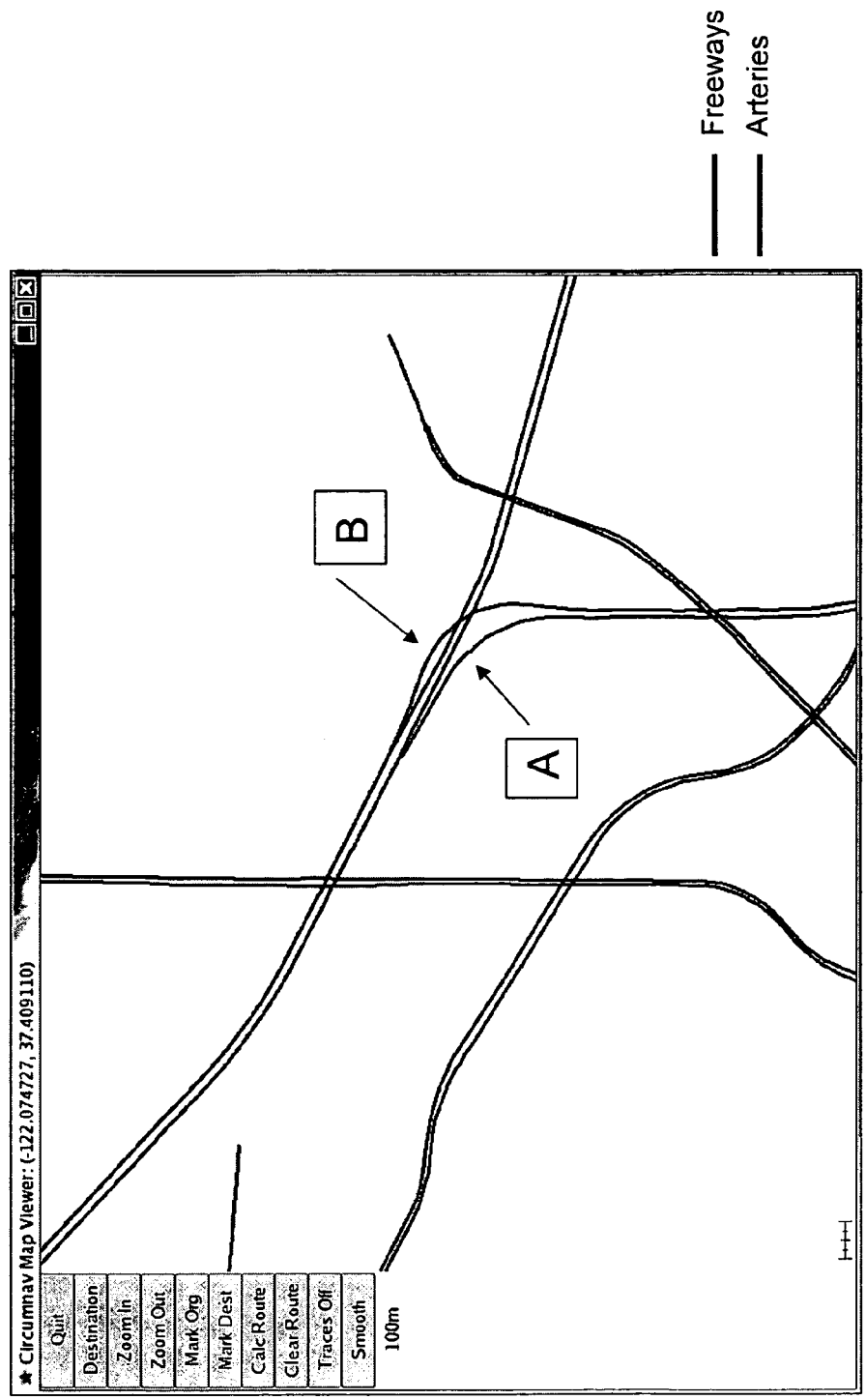
FIG.-C2

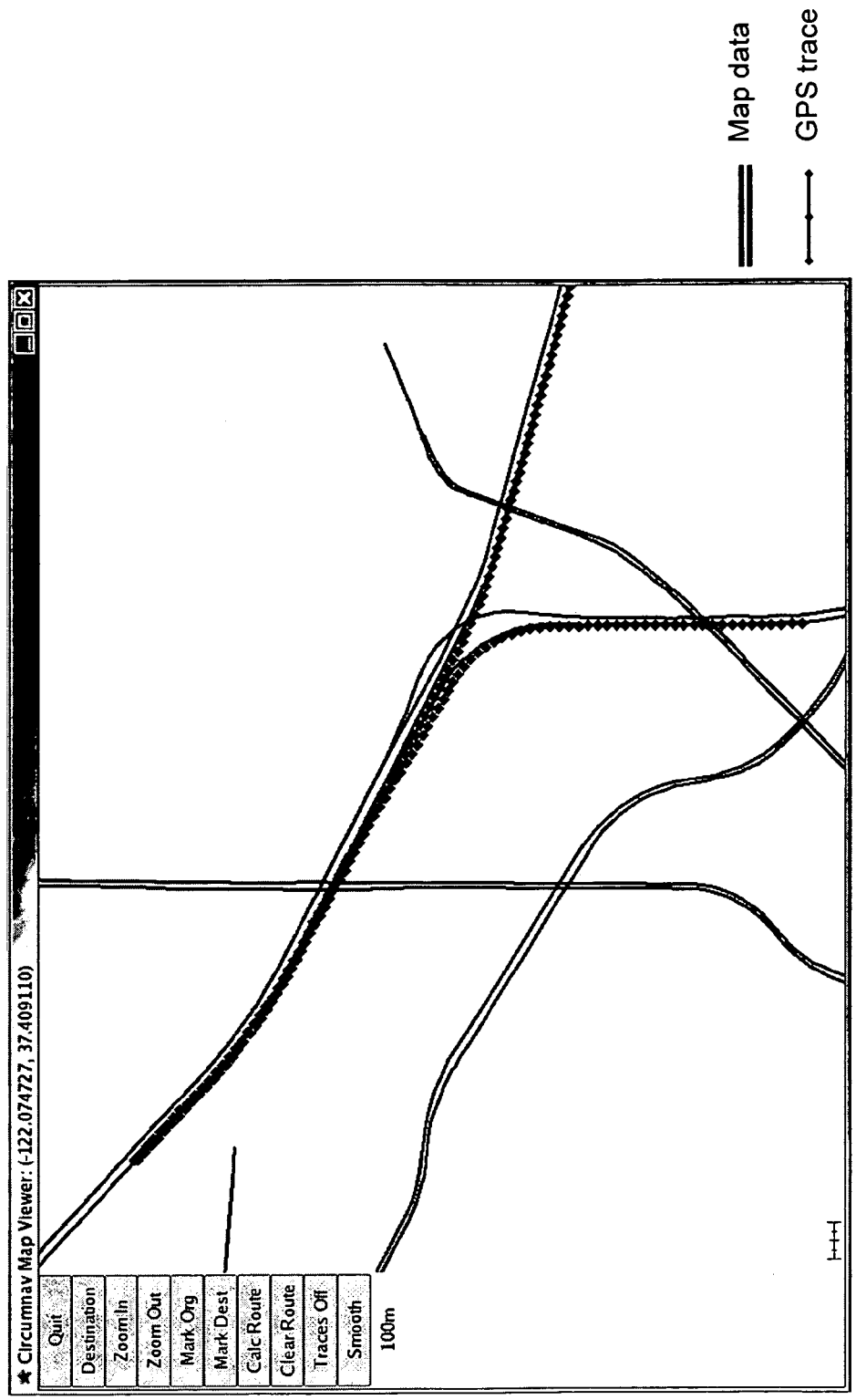
FIG.-C3

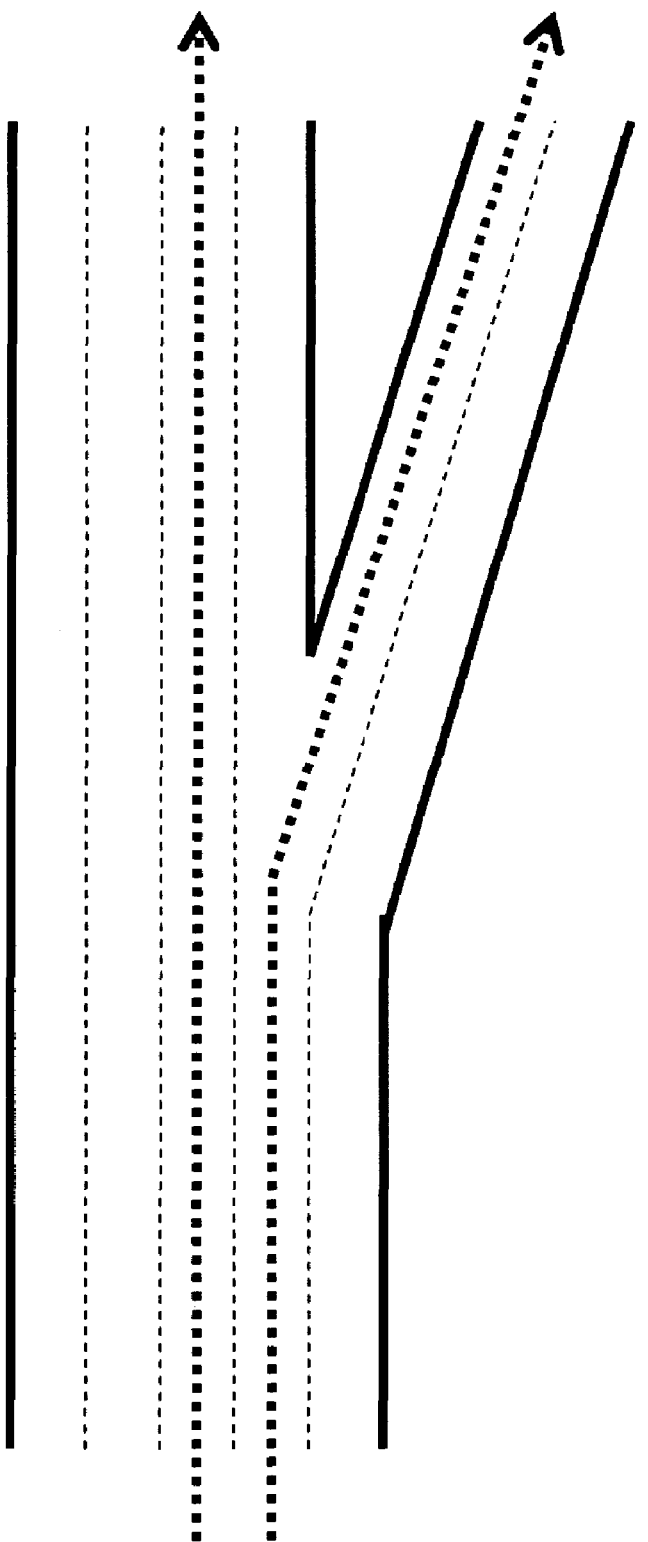
FIG.-C4

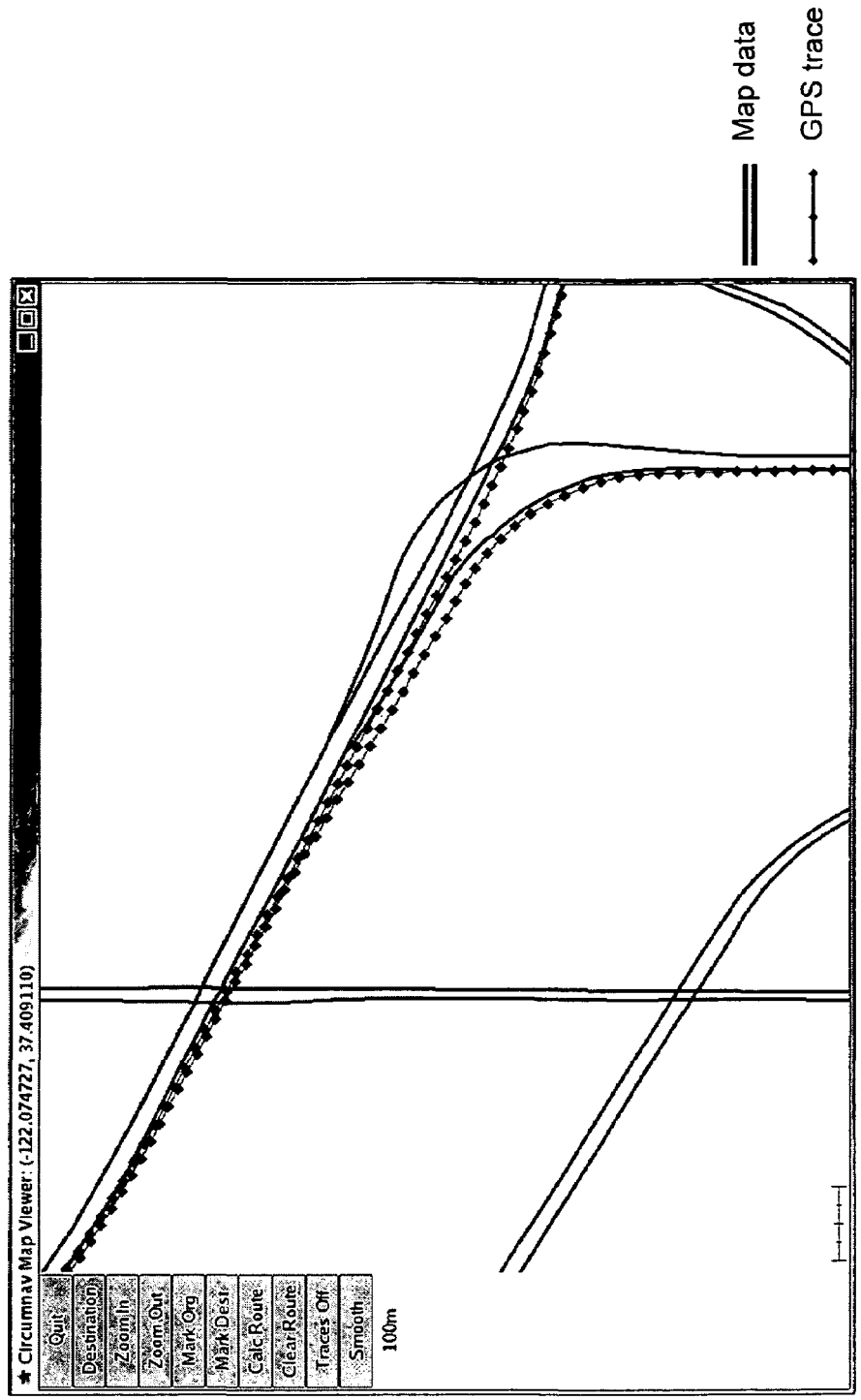
FIG.-C5

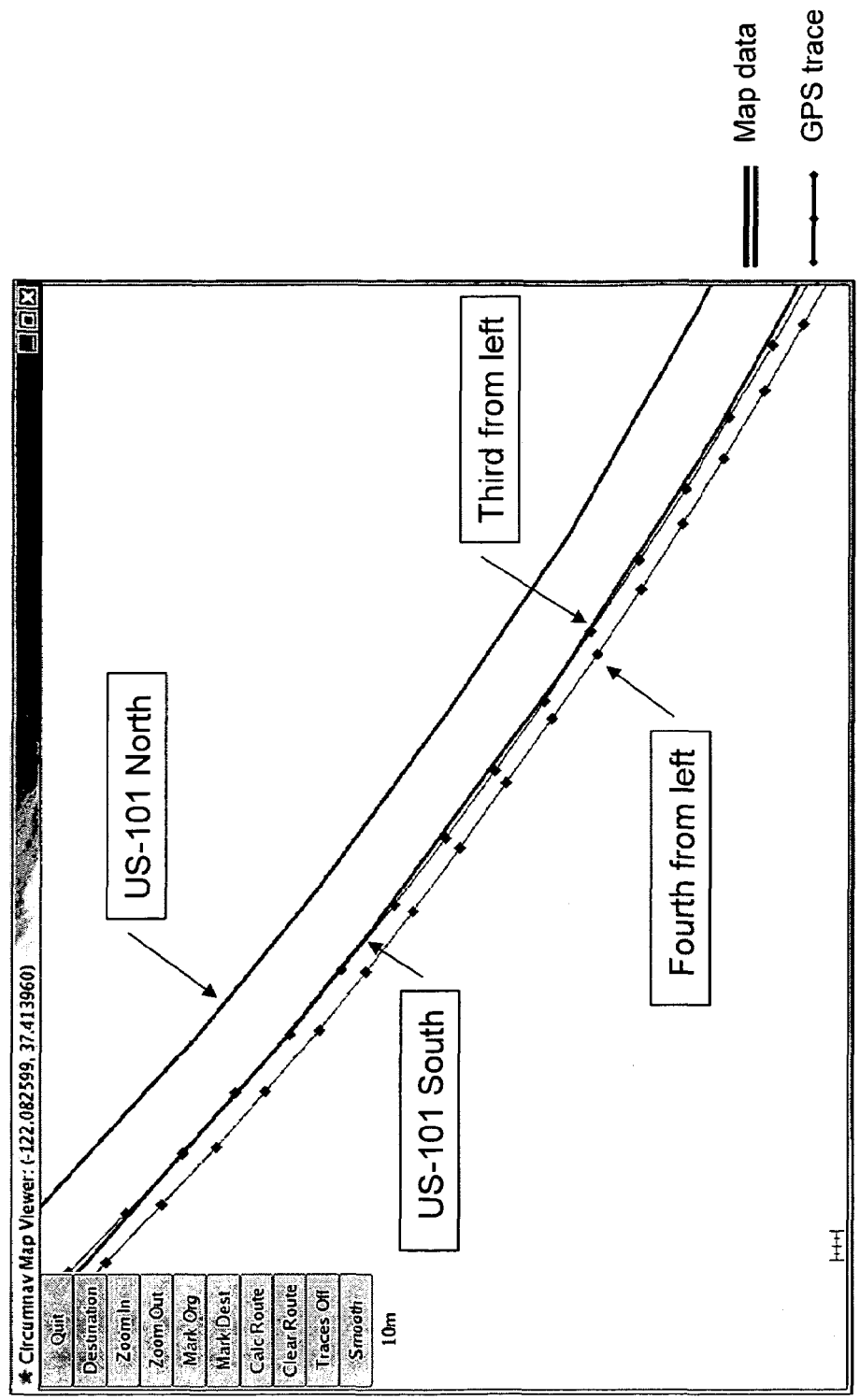
FIG.-C6

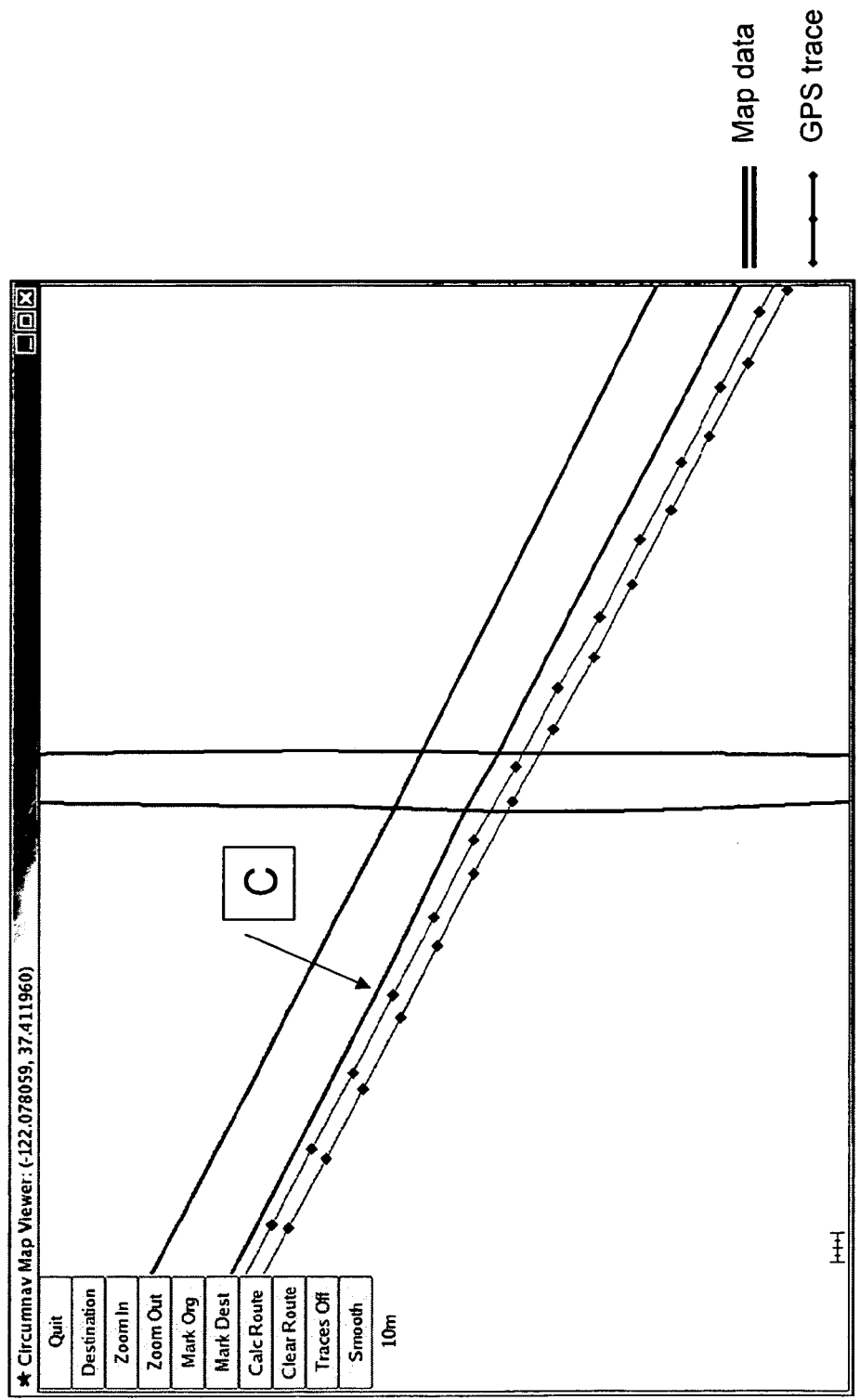
FIG.-C7

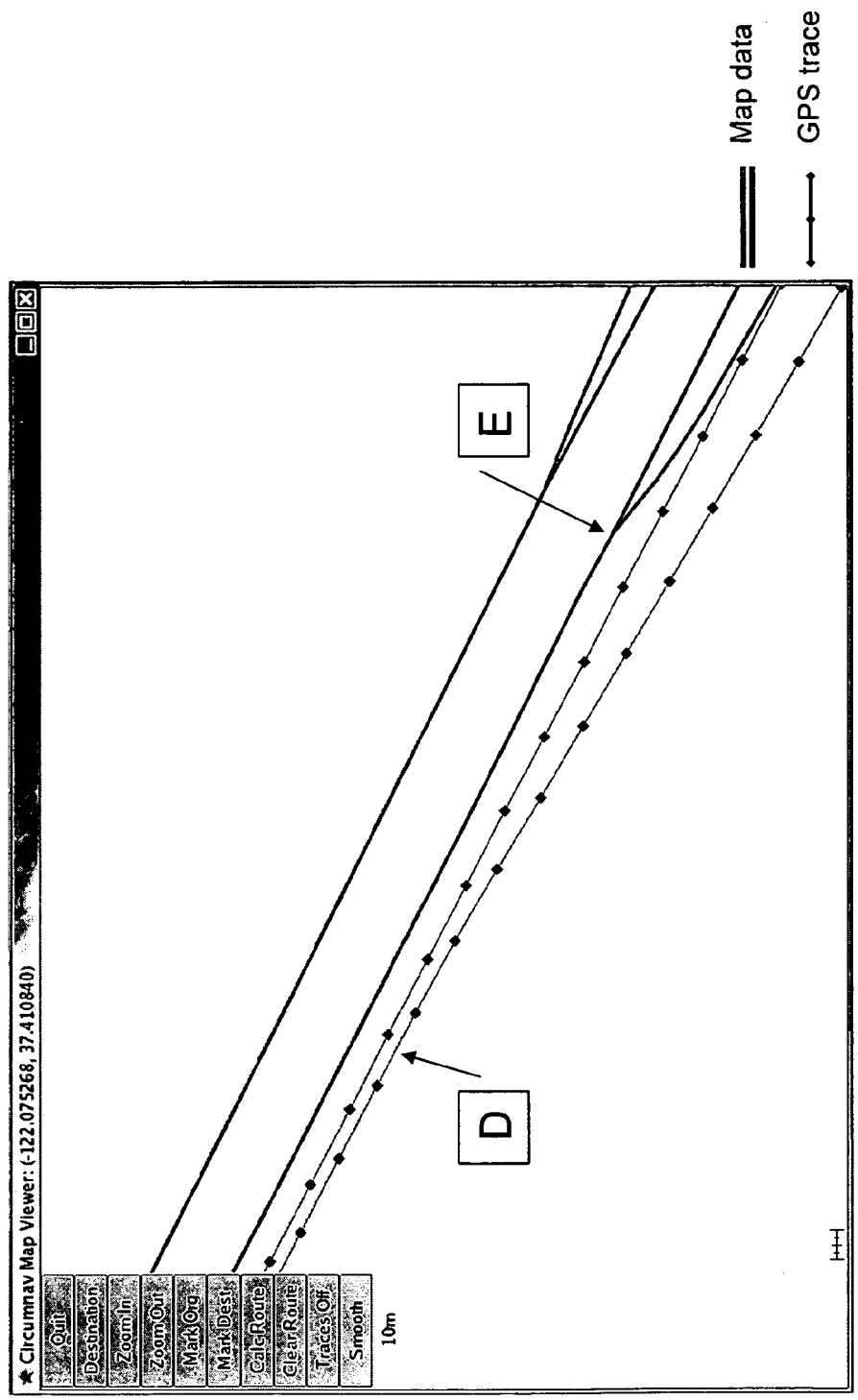
FIG.-C8

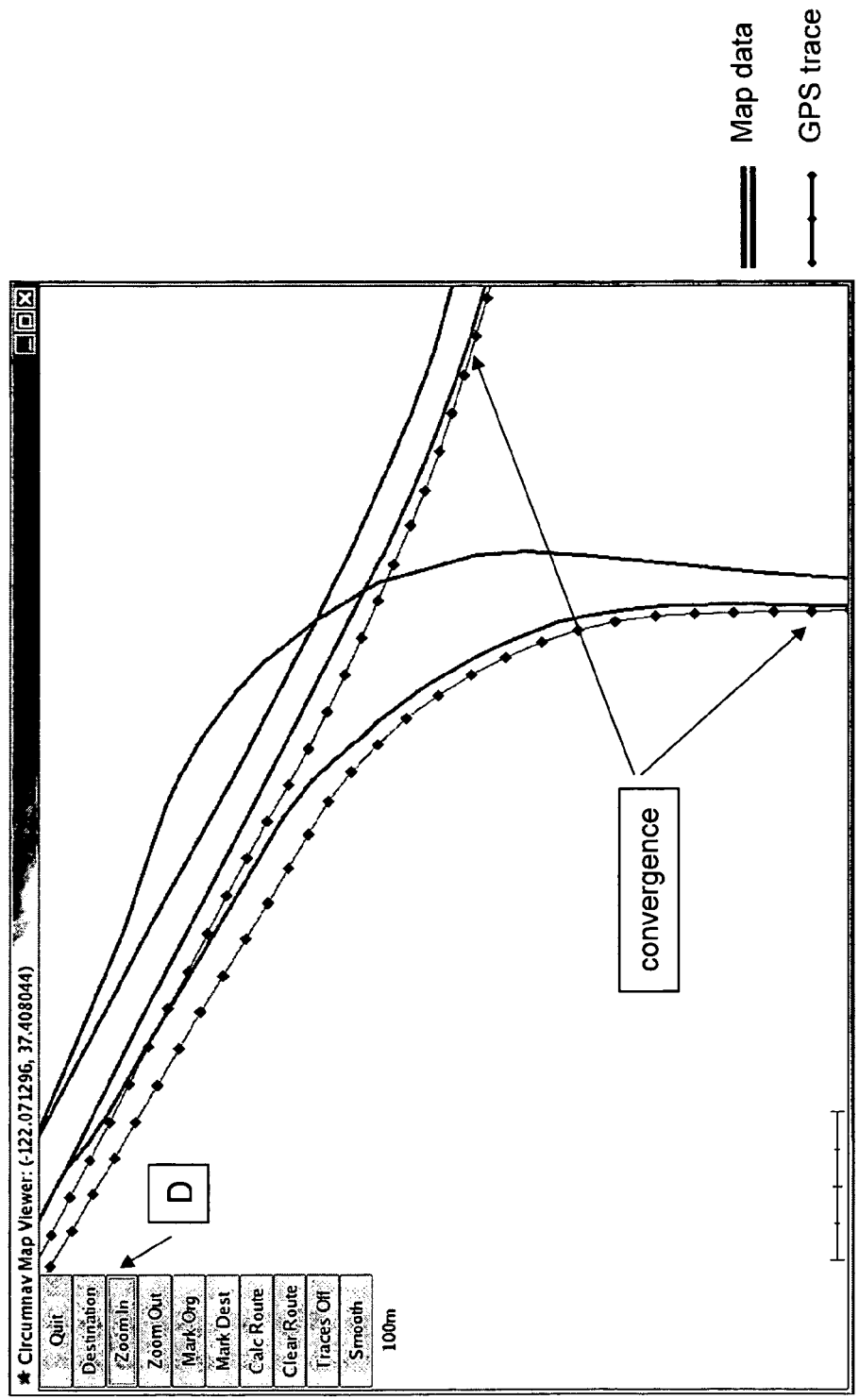
FIG.-C9

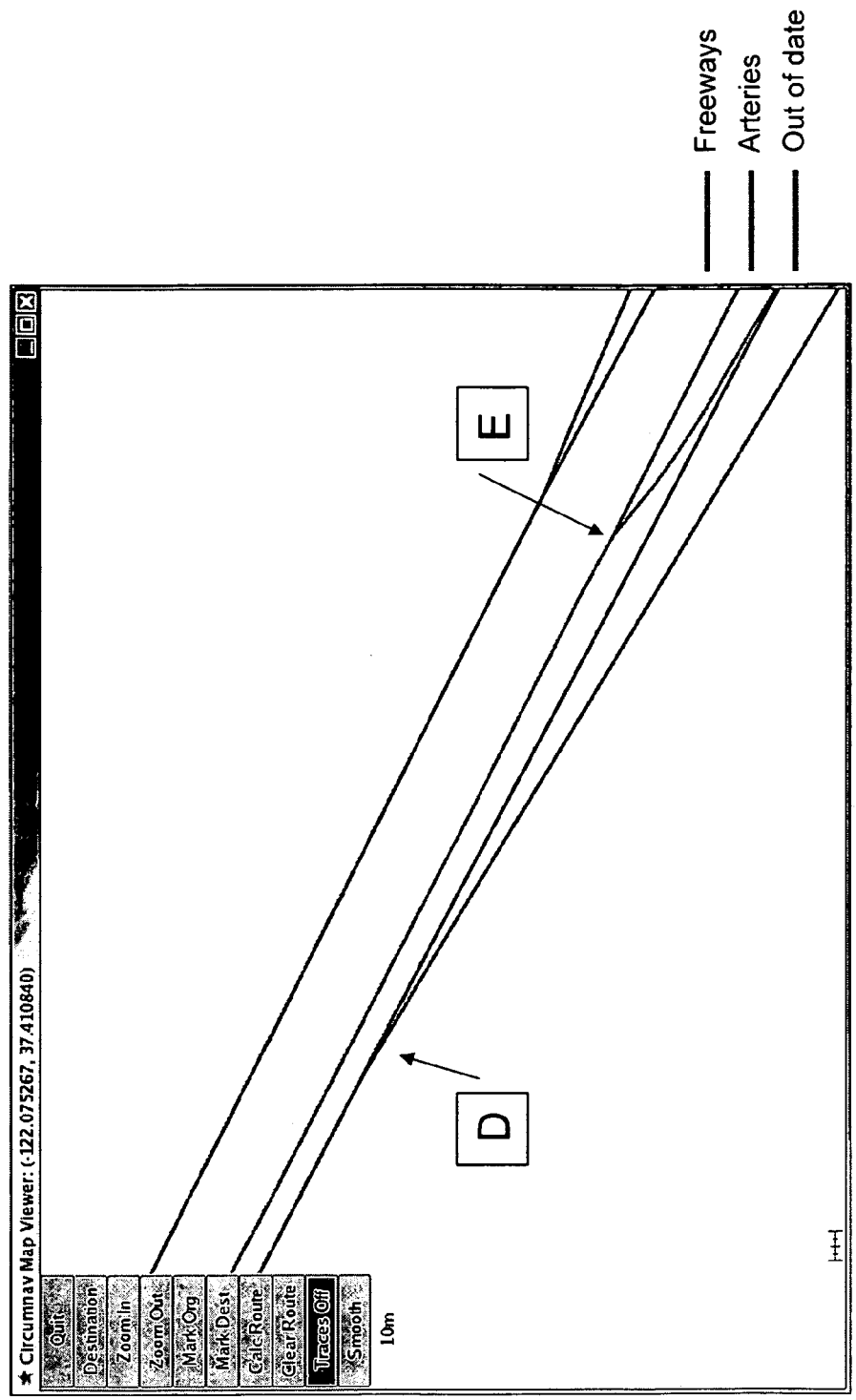
FIG.-C10

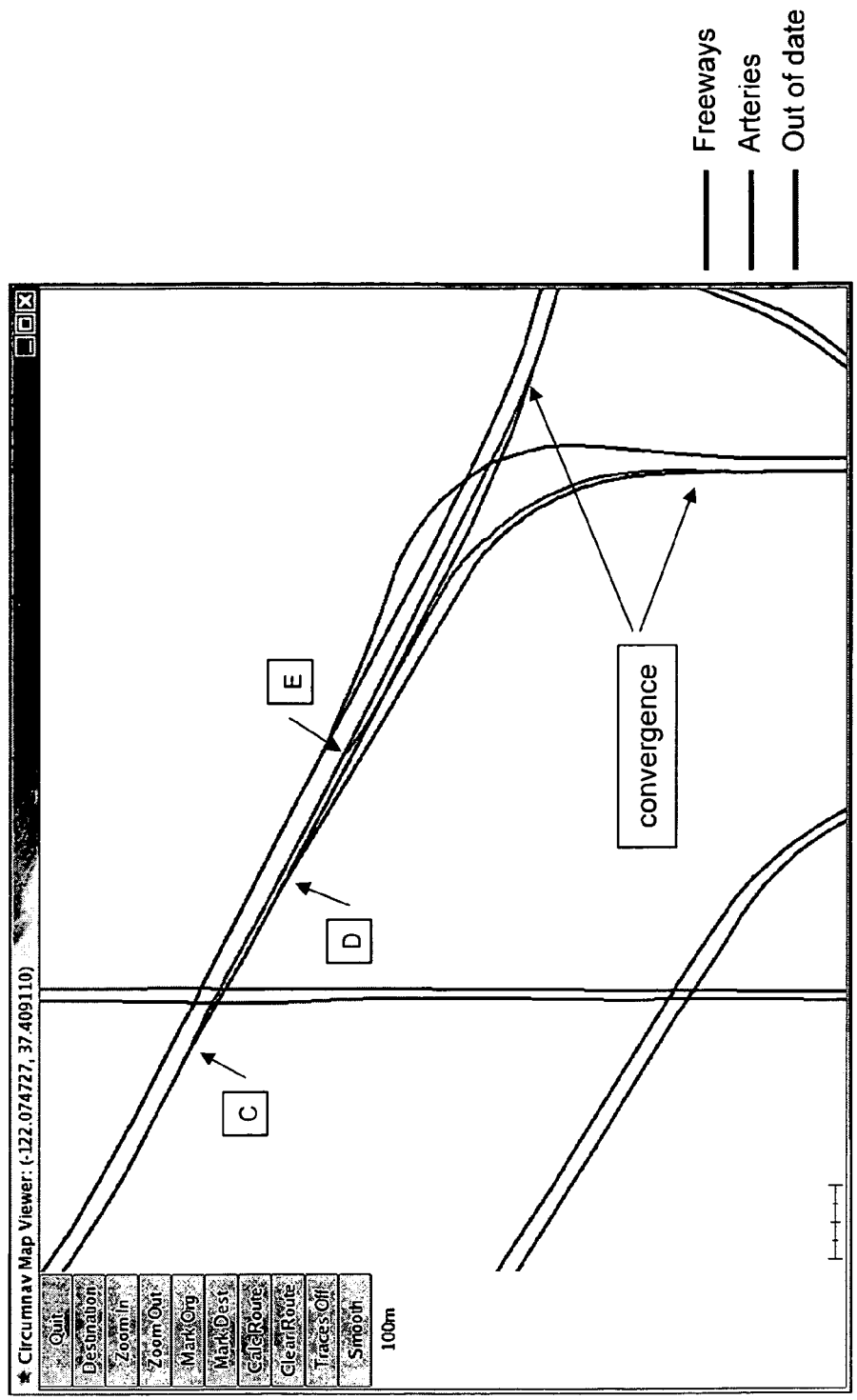
FIG.-C11

FIG.-C12

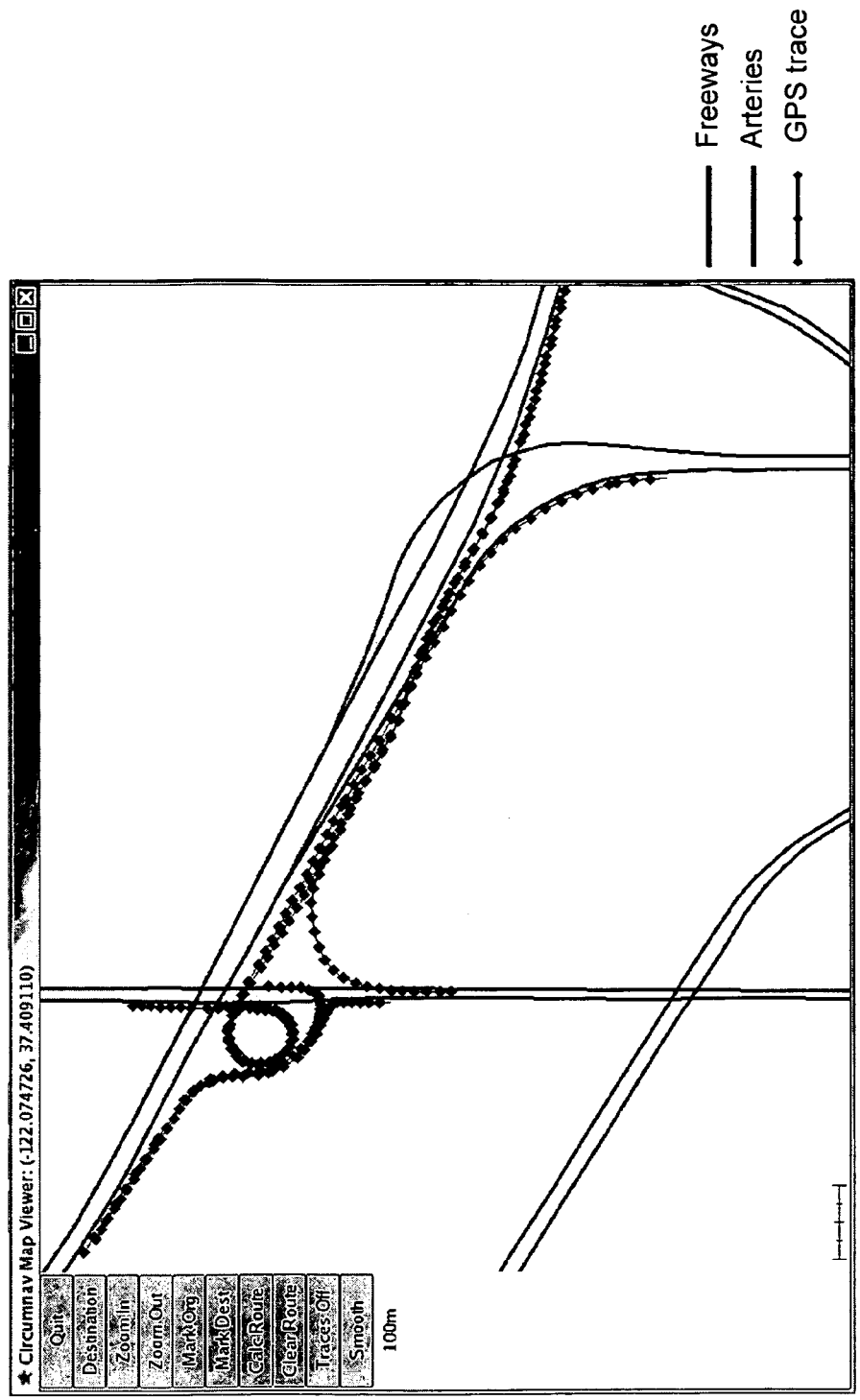
FIG.-C13

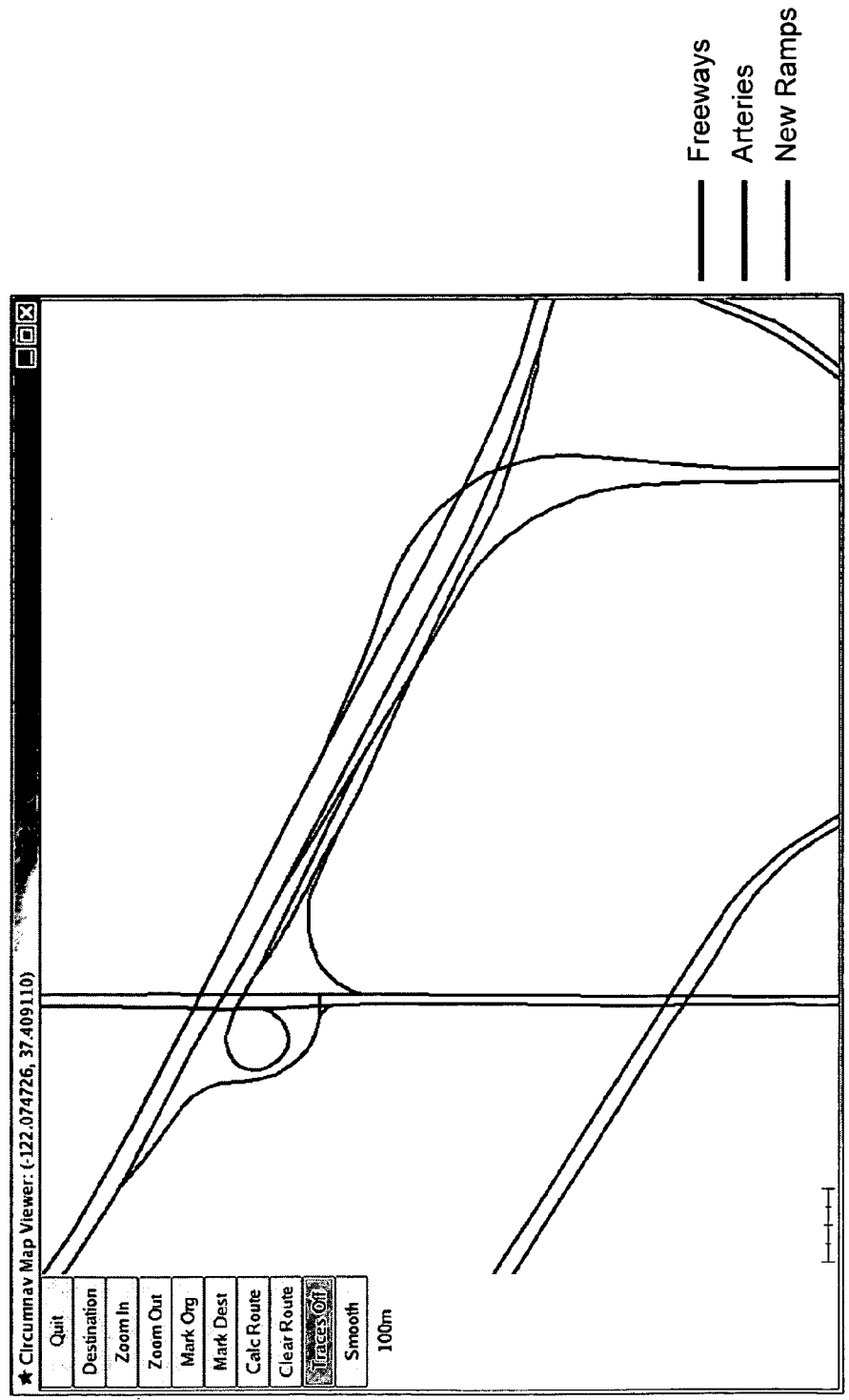
FIG.-C14

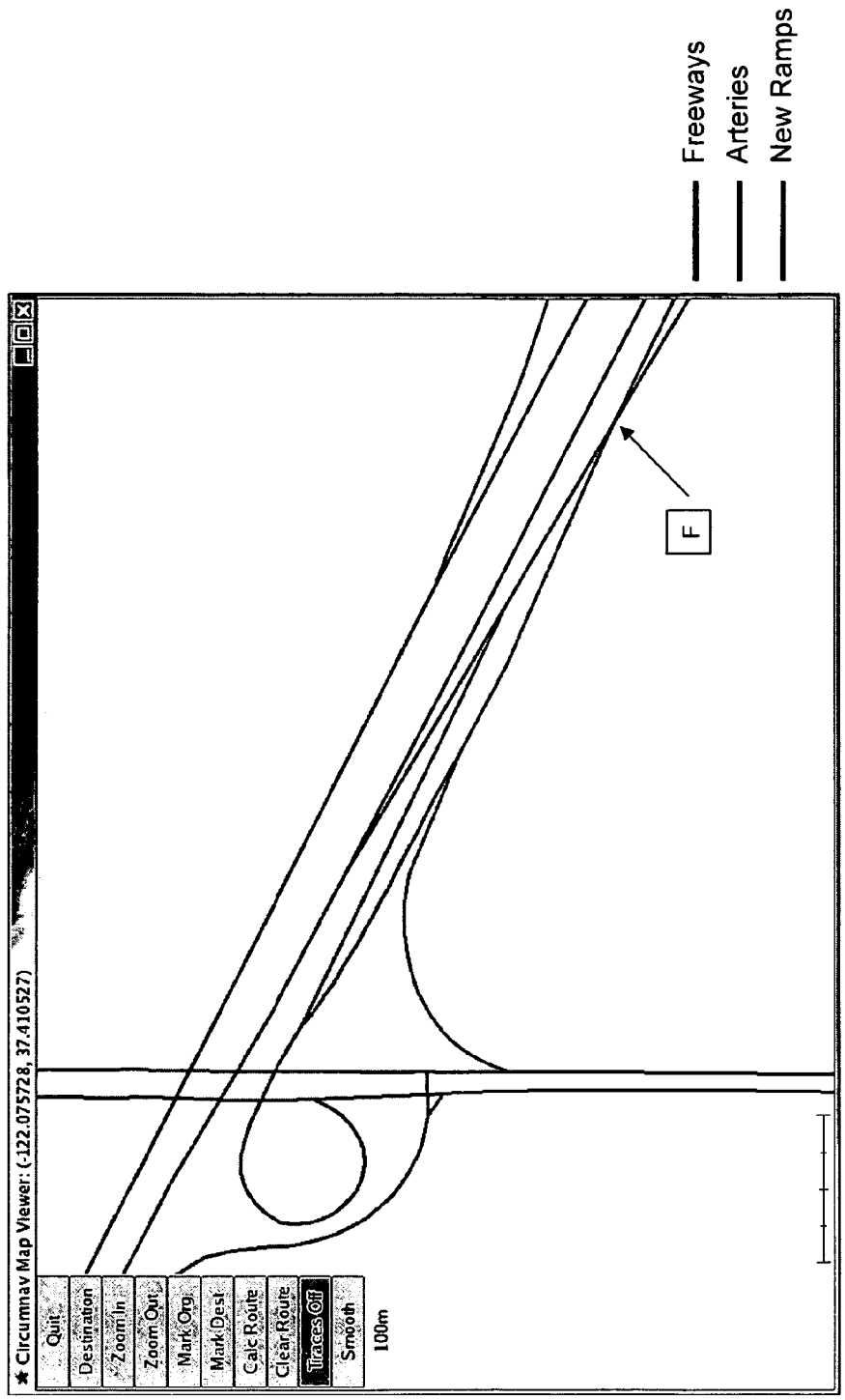
FIG.-C15

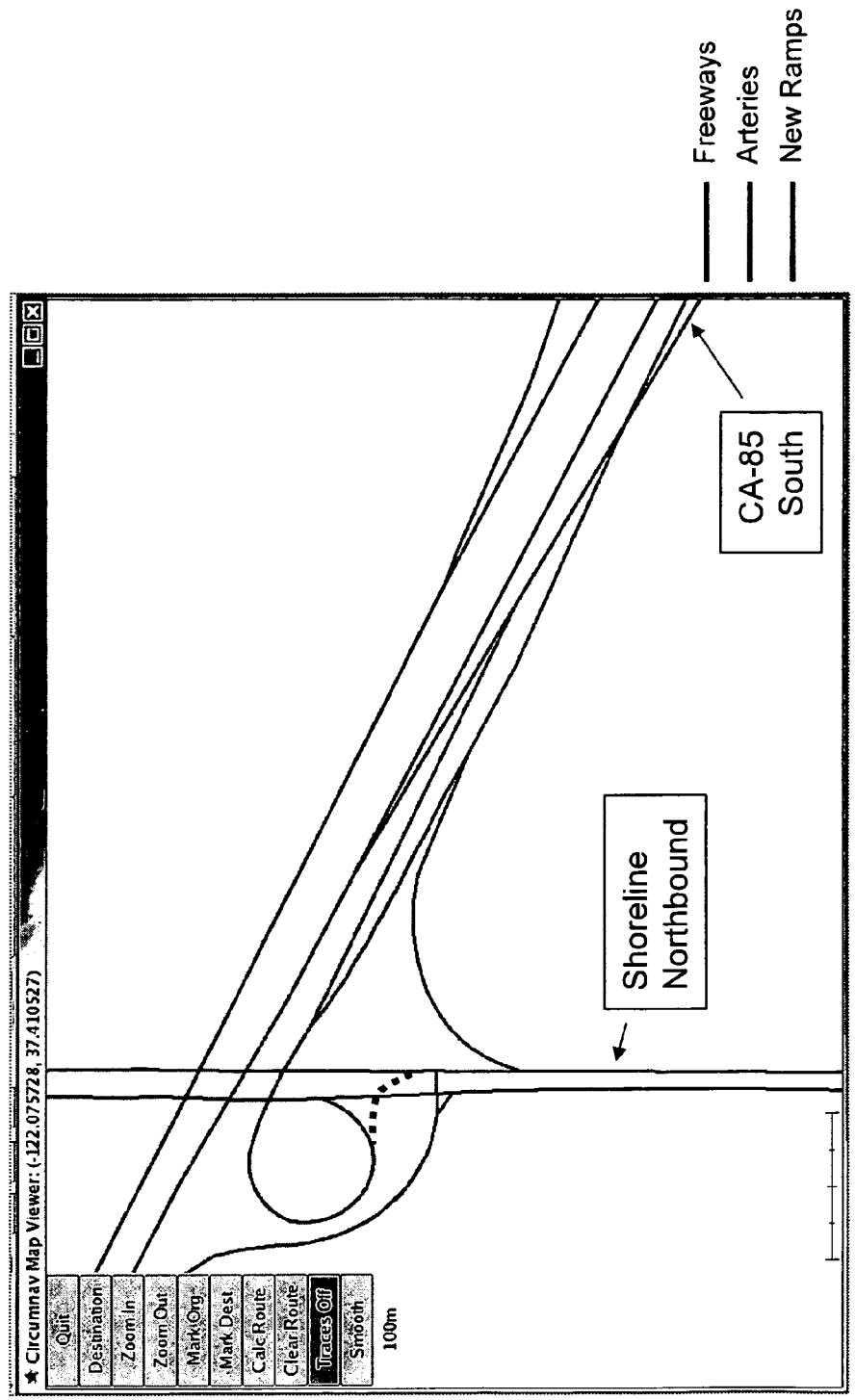
FIG.-C16

SYSTEM AND METHOD FOR IDENTIFYING ROAD FEATURES

RELATED APPLICATION

This application claims the benefit of U.S. Provisional Patent Application Ser. No. 60/726,894, entitled, "Road Feature Identification for Navigable Databases" filed by Brian Smartt and Craig Weisenfluh on Oct. 14, 2005, having the same assignee as this application and is hereby incorporated herein by reference in its entirety.

FIELD OF THE INVENTION

The present invention is related to computer software and more specifically to computer software for computer-aided navigation.

BACKGROUND OF THE INVENTION

Conventional computer aided navigation devices may contain a map database that describes the geometry, name and other information regarding roads in a geographic area. However, the map database may be inaccurate. Such inaccuracies result from any of several sources. One source of inaccuracy is that the map database itself contains an error. Another source of inaccuracy is that a temporary portion of the road is built around the regular road surface, such as may occur during construction or that the road has been permanently repositioned. Another source of inaccuracy is that the map database is incomplete. For example, the map database may not reflect the fact that a road that appears to intersect another road actually uses a diamond, cloverleaf or other form of off ramp to do so, and that direct access (i.e. without the use of one of the ramps) from one of the two intersecting roads to the other intersecting road is not possible. Another incomplete description may occur when the layout of the roadway cannot be accurately described due to limitations of the map database. For example, a single freeway off ramp that forks, with one fork appearing like a lane of a diamond-shaped off ramp and the other fork heading under the intersecting roadway may not be describable in the terms that the map database uses. Another example is a roadway that travels over or under another roadway rather than intersecting it, making it impossible to turn from one roadway directly onto to another. Because conventional map databases may not include altitude data, determining that direct turns are not possible is not itself possible using some conventional map databases.

Traveling around to check the accuracy of a map database, and surveying any differences would be prohibitively expensive and time consuming. It would be desirable to record the Global Positioning System (GPS) information received by a computer aided navigation device to detect, and correct for, any such inaccuracies. For example, as an automobile traveled along a ramp that did not appear on a conventional map database, periodically, the GPS coordinates of a navigation device in that automobile could be recorded and used to update the map database. However, a conventional GPS device may have sufficient accuracy to allow updating of a map database in this fashion to be performed with a level of accuracy that would correspond to that of conventional map databases.

What is needed is a system and method that can correct inaccuracies of a map database with reasonable accuracy.

SUMMARY OF INVENTION

A system and method receives sets of position data such as GPS data from a device that records it, and the data is compared with a map database to identify points of departure from, or points of merging onto, a road described by the map database or a path identified as described herein, but not described by the map database. The system and method places data collected nearby either by different devices or by the same device at different times that is between two departure or merge points, and builds the data points from each device collected approximately at the same time into a trace. A trace is a collection of such data points and a function for connecting the points, such as a line or a curve. A quality level is optionally assigned to each trace, for example by determining the number of satellites the device recording the position data was in contact when the data was recorded, or by correlating the date and time the data was recorded to dates and times of operations of satellites. The trace in the group for which no other trace has a higher quality level is selected as a primary trace and, intersecting points are selected along the primary trace, for example by taking a midpoint along the function connecting each adjacent pair of points on the primary trace. The locations of the traces are used to compute a location corresponding to each intersecting point, for example by combining the values of the traces at a line normal to the intersecting point, for example averaging their positions at the intersection of the normal line and each trace as determined by the function for that trace at the normal line. The combination may be weighted, for example by assigning a greater weight to traces having a higher quality rating than to other traces. The sequence of locations corresponding to the primary trace are assigned as a path, and the path may be used as if it were a road on the map database.

The system and method may receive location information, the date and time, a device identifier and height information as various devices travel on roads or other areas. Data received around each intersection may be separately grouped, and for each group, the data may be further segregated by the road on which the device was traveling. For each road in the group, a set of points representing the height at that point may be identified using the received heights of the road, for example by averaging the received ones, optionally weighting them according to the quality of the measurement, which may be a function of a number of satellites with which the device recording the height is in communication. The second derivative of the heights may be obtained and for any road for which the second derivative exceeds a threshold, or for which the sum of the second derivatives exceeds a threshold if the slope of the roads differs by a threshold amount, or for any intersection in which the second derivative of only one of the roads exceeds a threshold amount, the corresponding intersection is identified as not crossing at the same grade level.

FIG. A1 is a flowchart that illustrating a method of processing GPS data to produce more accurate route information according to one embodiment of the present invention.

FIG. A2 is a graph showing a set of traces traversing a similar but not identical path between points A and B.

FIG. A3 is a graph showing the intersection of two freeways with illustrative trace data.

FIG. A4 is a graph showing an example of a prediction bubble for calculating a trace quality metric.

FIG. A5 is a graph showing an example implementation of a trace aggregation method according to one embodiment of the present invention.

FIG. B1 is a graph showing an example freeway interchange with ramps and over crossings.

FIG. B2 is a map of the main roads in Palo Alto and Los Altos showing San Antonio Road and it's major cross streets.

FIG. B3 is two graphs showing of elevation vs. distance traveled from each end of San Antonio Road in Palo Alto and Los Altos, Calif.

FIG. B4 is a flowchart illustrating the steps for a method of identifying grade separated road crossings according to one embodiment of the present invention.

Figure 3A:
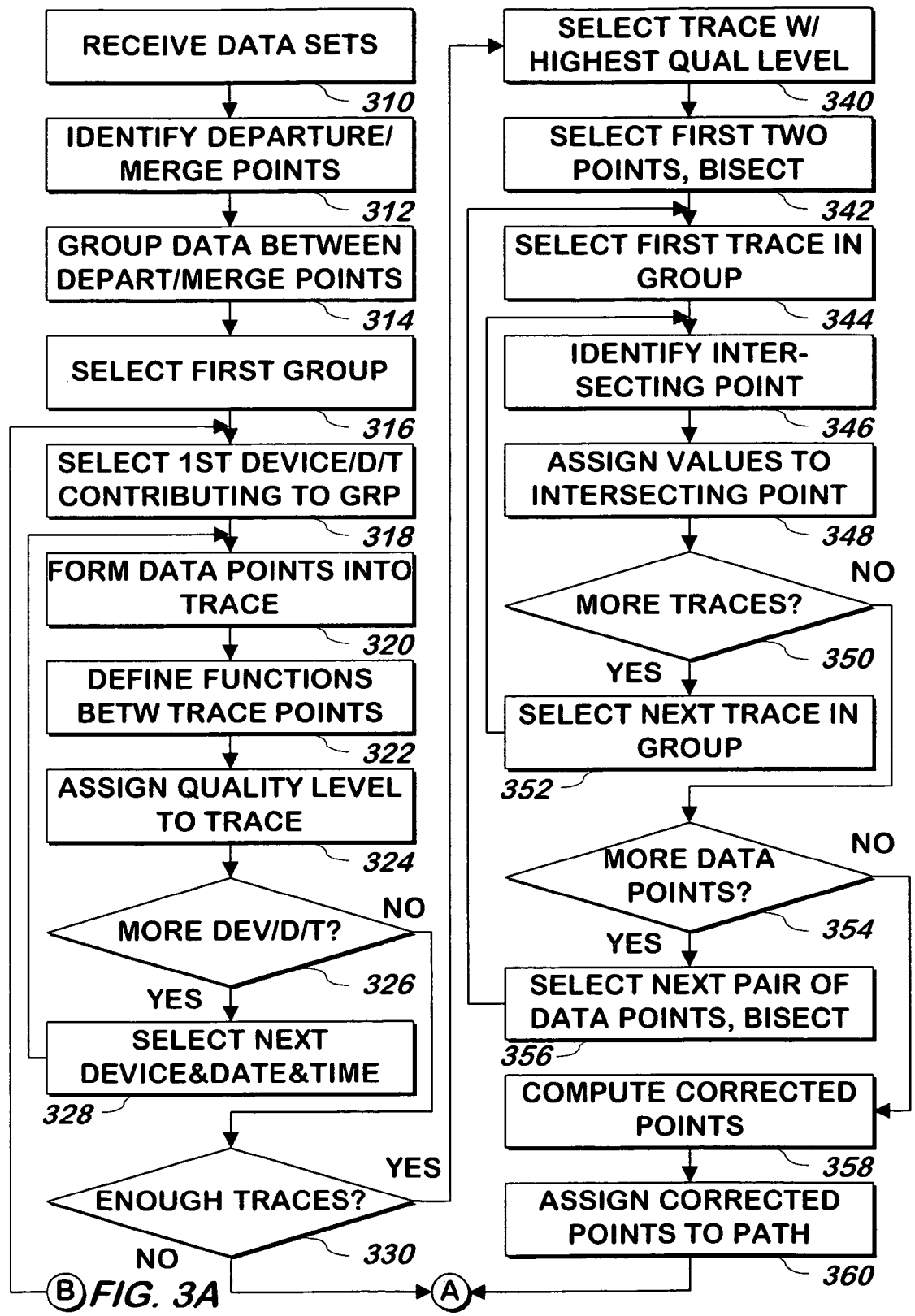
Figures 3B, 3D:
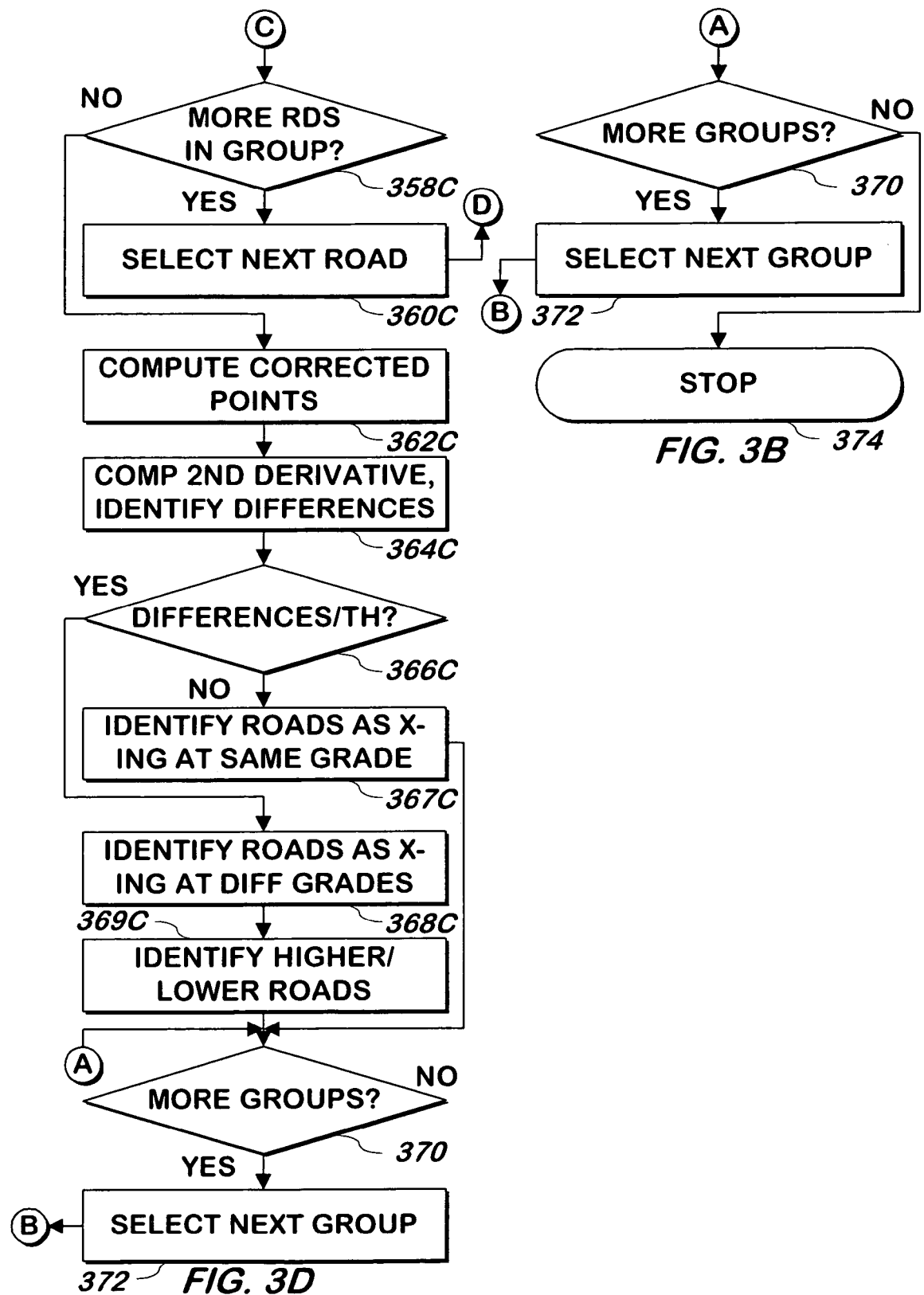

FIGS. 3A and 3B is a flowchart illustrating a method of identifying paths that vary from a map database according to one embodiment of the present invention.

Figure 3C:
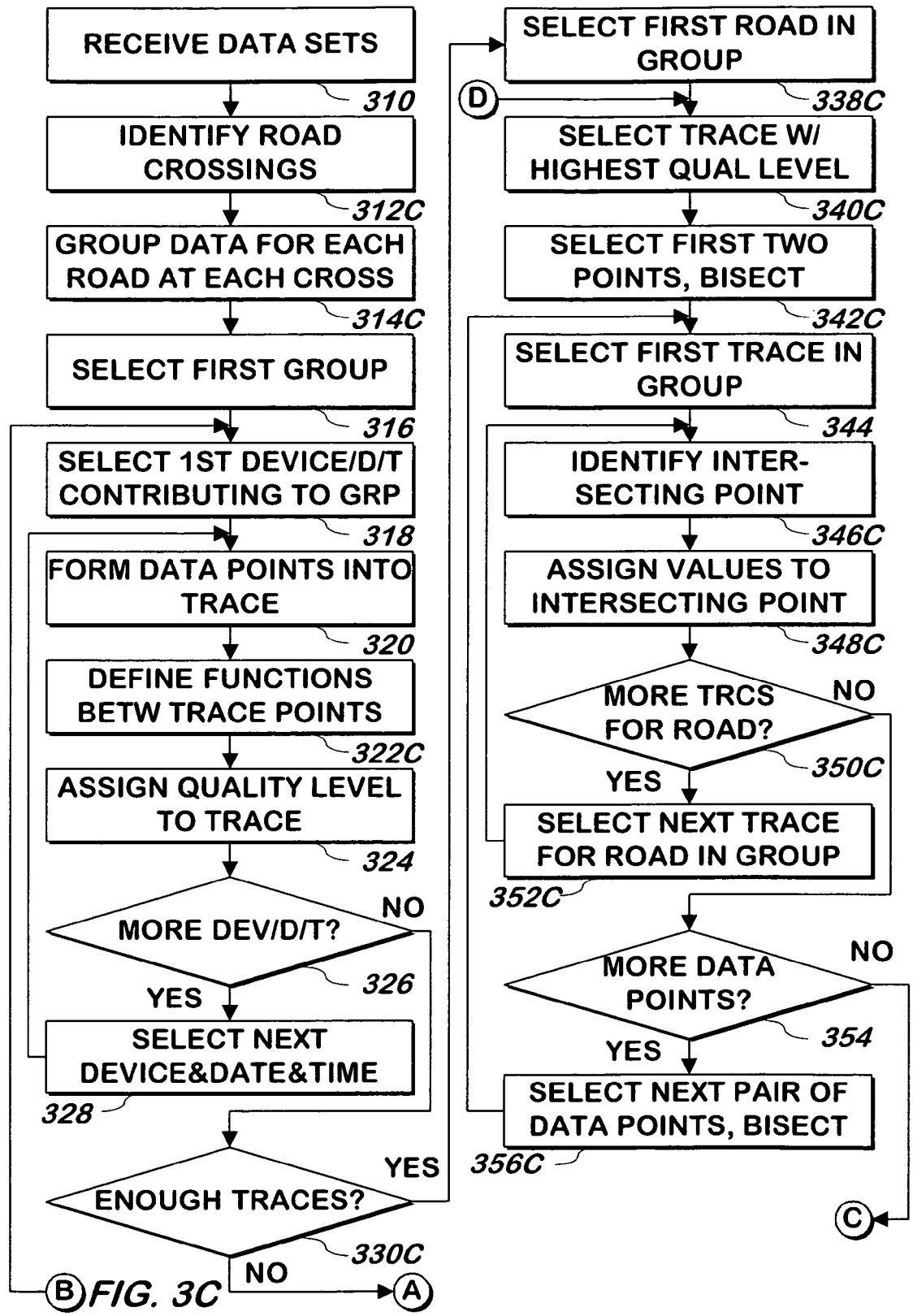

FIGS. 3C and 3D is a flowchart illustrating a method of identifying intersections of roads that do not cross at the same grade level according to one embodiment of the present invention.

FIG. C1 is a graph showing the US-101 interchange with CA-85 in Mountain View Calif.

FIG. C2 is a graph showing the same interchange as FIG. C1 with ramps removed for clarity.

FIG. C3 is a graph showing the same interchange as FIG. C1 with two GPS traces collected and aggregated according to one embodiment of the present invention.

FIG. C4 is a graph showing a schematic representation of the US-101 South lanes in the area of the interchange shown in FIG. C1.

FIG. C5 is a graph showing the traces shown in FIG. C3 with a higher magnification.

FIG. C6 is a graph showing a further zoomed in view of the traces shown in FIG. C3.

FIG. C7 is a graph showing the traces shown in FIG. C3 with higher magnification at the Shoreline Road over crossing of US-101.

FIG. CB is a graph showing a zoomed in view of the lanes of US-101 further south of the Shoreline over crossing.

FIG. C9 is a graph showing a less magnified view of the remaining sections of interest in the trace data of FIG. C3.

FIG. C10 is a graph showing the same view as FIG. C8 illustrating a midpoint in the map updating process according to one embodiment of the present invention.

FIG. C11 is a graph showing the complete area of the map data update according to an example implementation of one embodiment of the present invention.

FIG. C12 is a graph showing the final state of the US-101/CA-85 interchange with out of date map elements removed.

FIG. C13 is a graph showing a collection of aggregated traces representing some US-101 South ramp connections that have been modified by the construction.

FIG. C14 is a graph showing new sets of ramps derived from GPS trace data according to one embodiment of the present invention.

FIG. C15 is a graph showing a magnified view of some connectivity details for the new ramps.

FIG. C16 is a graph showing one connection in the new ramp construction that was not treated in this example.

Figure 6:
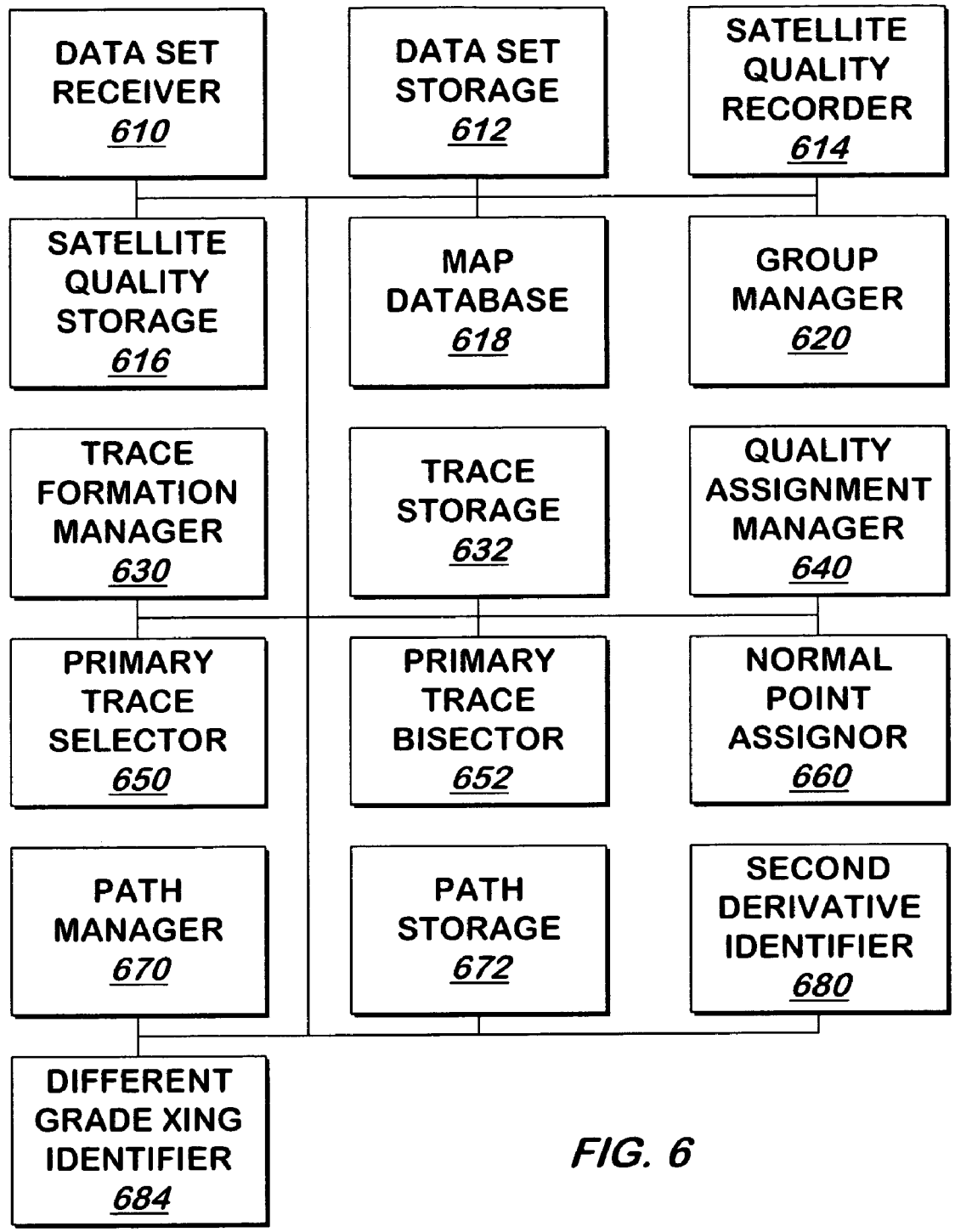

FIG. 6 is a block schematic diagram of a system for identifying paths that vary from a map database and intersections of roads that do not cross at grade level according to one embodiment of the present invention.

Figure 7:
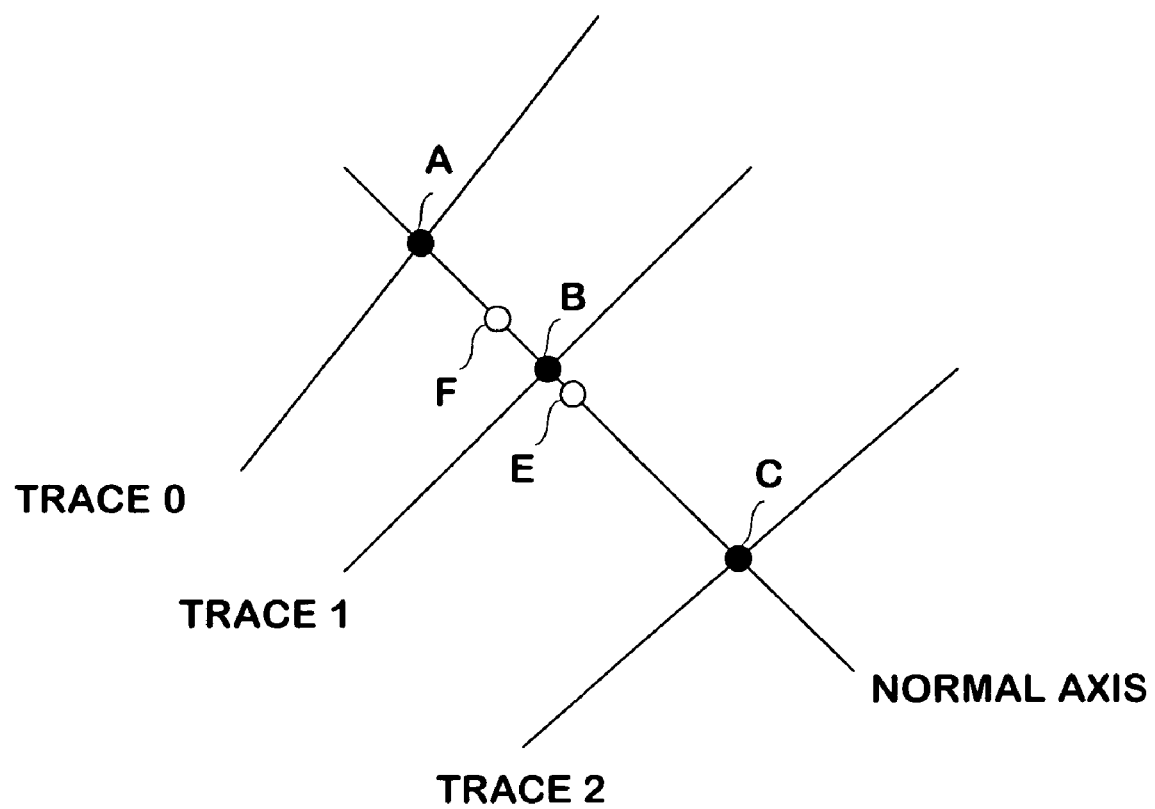

FIG. 7 is an illustration of three traces intersected by a normal axis, according to one embodiment of the present invention.

DETAILED DESCRIPTION OF A PREFERRED EMBODIMENT

Figure 1:
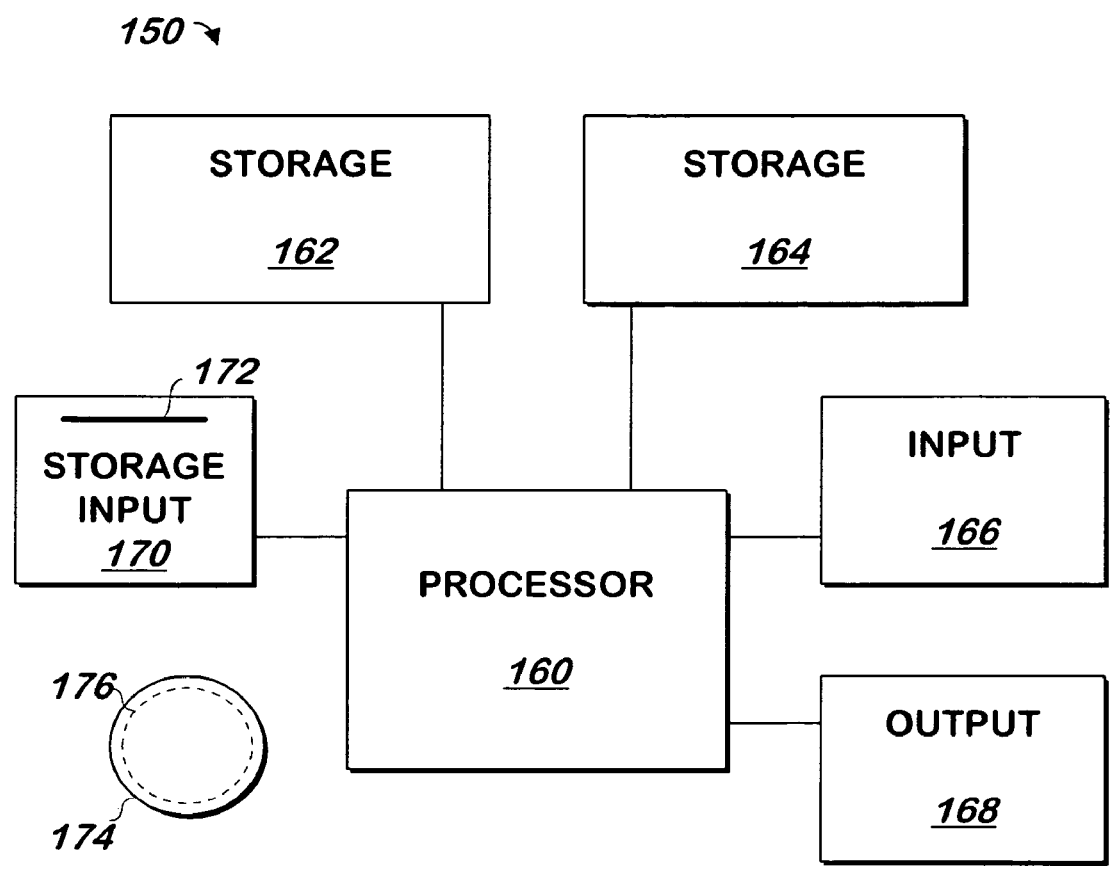
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

One aspect of the present invention provides systems and methods for generating and/or improving drivable map databases. In general, embodiments consistent with this aspect of the invention collect location and trajectory information for objects moving along roadways or other travel paths. Information may be collected as a series of discrete data points, for example, by periodically collecting latitude and longitude information provided by a global positioning system (GPS) transceiver, and such data points may be referred to herein as "fixes" or "points". Other systems and methods may be used to collect the fixes.

Position determination systems and methods, such as for example global positioning system (GPS) transceivers and networks, generally determine position within some finite error from the "true" position of the measurement point at the time of measurement. GPS fixes are prone to errors in both accuracy and precision that arise due to movement of the satellites relative to the transceiver, interference with the signal from one or more satellites to the transceiver, calibration and calculation errors, and the like. For determination of any particular point in space, these error may generally be quantified as an error probability. In other words, for a given point, the probability that the "true" position is within some distance of the measured point is described by a probability distribution, for example a standard bell curve. For a position on the surface of the earth, this curve is generally a function of the radius from the identified point. The probability reported is the likelihood that the "true" position is within a given radius of the measured point. The error associated with GPS measurements at a given position may vary slowly with time due to movement of satellites in the sky. However, for the period over which a typical vehicle traverses a given road, the error is relatively constant.

In various embodiments, the present invention generally provides methods and systems for creating a "best estimate" of the route of a road or other traveled route by aggregating a plurality of "traces" of data points collected by following the road or route. A trace is a set of data points collected as a device moves, where the data points reflect, at least approximately (for example, up to the error of the measurement device, such as was described above), the location of the device as it moves. The data points may be collected periodically, such as every tenth of a second, upon the detected movement of a threshold amount of distance, such as a tenth of a mile, or at random times or distances. While the word "road" is used throughout the instant application, it should be apparent to one of skill in the art that the present invention may be readily applied to any path over which vehicles, people, animals, or the like travel. Furthermore, "road" should not be construed to indicate that the present invention applies only to the complete length of a given road. The invention may be applied to any portion of a road or path, to the entire length of the roadway, or to any intermediate segment of any length. As explained in greater detail below, "trace" refers to a collection of discrete data points collected by a single position determining device on one traversal of one or more roads or road segments. The discrete data points in a trace can be connected by line segments that may be straight or curved depending on the choice of the algorithm used to estimate the shape of the road. Additional detail regarding potential methods for creating traces from discrete data points collected by traversing a road or road segment with a position determining device is provided in the related nonprovisional patent application.

Representative steps of a method according to one embodiment of the present invention are illustrated in the flowchart 100 shown in FIG. A1. A series of data points, such as for example position fixes and/or trajectory headings or the like, received from a moving vehicle or device are interpreted as having occurred due to travel of a device such as a GPS transceiver or the like along a road or some other travel route 102. These points are received with an indication of the order in which the positions they represent were reached by the device for which they were recorded. This "binning" or assigning of collected data to a given road segment may be accomplished in a number of ways. In general, a group of traces are examined and compared to identify a subgroup of the traces that exhibit consistency in one or more criteria, including but not limited to position, heading, continuity, and the like. For the purposes of this description, continuity refers to the tendency of the position and/or heading/trajectory in a given trace or group of traces to behave in a physically reasonable fashion, such as one that an automobile might be expected to take. In one example, a trace is interpreted as having continuity if the second derivative of the position fixes or the trajectory fixes in a trace is not undefined at any point along the trace.

One implementation of this embodiment may begin with the general preliminary knowledge that a road or a segment of a road exists in a given approximate region. Position and/or trajectory/heading traces that pass through this region and that behave approximately similarly within some tolerance or allowable error over a finite distance within the region may be assumed to have been collected on the same road segment. An example of this aspect of the present invention is illustrated in FIG. A2, in which a group of traces 202 generally follow a similar path over a distance from A to B.

For a case where two roads are connected by a ramp, such as for example two freeways as shown in FIG. A3, aspects of the present invention may be applied to identify and locate the connector ramp or ramps between the various directions of travel on the roads in the interchange. In the example shown in FIG. A3, some traces collected from vehicles traveling in an approximately southeast by east direction on a first road 220 deviate from the first road 220 in the vicinity of a departure point 222. These deviating traces tend to follow a ramp 224 that joins the south by southwest direction of travel on a second road 226. The subgroup of traces traversing the two main roads may be identified in one or more ways. It is advantageous to identify a point of departure 222 for the ramp 224 from the first road 220 and a point of arrival 230 for the ramp 224 onto the second road 226. In one embodiment, the point of departure 222 may be identified by comparison of traces that seem to deviate from the route of the first road 220 with traces that generally follow the route of the first road 220 through the interchange between the first road 220 and the second road 226. The points of departure and/or arrival may be designated in any effective coordinate system, be it Cartesian, distance along a given road, or some other system. A determination that the road is being traveled on, or deviated from, may be made my comparing the coordinates from the trace to those described by a conventional map database: the deviation occurs when the coordinates differ from those expected from traveling on a road by a threshold amount, and otherwise, the road is being traveled on if more than one data point is consistent with such travel using the map database and the threshold.

Continuing with the method flow chart of FIG. A1, once a group of data are identified as being associated with a given road, each individual data set, for example, each set of points collected for a single pass along the road, is formed into a trace that represents the road 104. In one example, the trace is formed merely by connecting all of the data points in the set with straight line segments, from one point to the next, in the order in which the data points are collected. In alternative embodiments, the trace may be formed by connecting the data points with a more complex function that includes one or more curves.

Each trace representing a given road may be assigned a rating based on one or more metrics of the quality of the data used to form the trace 106. For GPS measurements, this rating may optionally be based on the number of satellites the transceiver is tracking, such information being recorded with the data points. Alternatively, or additionally, trace quality may be quantified by the number, frequency, etc. of "outages" of satellite reception, either recorded with the data points or correlated with the data points using times in which outages are identified, with the date and time of recordation being recorded with the data points. In one embodiment, trace quality may be assessed, either instead of, or in addition to the methods described above, by examining whether the trace behaves in a manner that is physically reasonable for the mode of transportation being tracked. Conceptually, for a motor vehicle transportation mode, if data points in a candidate trace exhibit substantial positional and/or trajectory deviations in directions that are substantially orthogonal to the direction of movement experienced at previous points in the trace, this could indicate trace data with a lower quality level.

An approach to quantify this metric according to one embodiment is illustrated in FIG. A4. A "bubble" of predicted, probable positions and trajectories is projected based on each data point in the trace and the vehicle's heading and velocity behavior at that point. The bubble need not be round like a bubble, but may be conical or otherwise shaped. If a trace contains one or more data points that are inconsistent with predictions based on the previous data point or points in the trace, for example, because a subsequent data point falls outside the bubble defined by the previous data point, the trace may be considered suspect or otherwise given a lower quality rating. As an illustrative example, if a motor vehicle is traveling at 100 km per hour due east at a point 240 on the trace 242, an algorithm according to the present invention might predict a range of potential locations for the next data point collected one second later to be centered on a predicted point 244 approximately 28 m east of the previous point—the point the vehicle would reach in one second if it continued at the same velocity and heading it had at the previous point 240. In this example, the bubble of predictions for the next point in the trace could comprise a cone 246, such as for example that shown in FIG. A4, that reflects physically reasonable actions the vehicle could perform in one second given its starting position, speed, and heading. The size of the prediction bubble may be adjusted depending on the desired tolerance. Other metrics for trace quality may also be used. One of skill in the art should be able to determine an appropriate rating metric based on the teachings of the present invention.

Once the traces have been quality rated, the trace with the highest rating is assigned as the primary trace 110 as shown in FIG. A1. If an independent representation of the road is already available, such as for example if the method of the present invention is used to refine or improve an existing map database, the primary trace may advantageously be based upon the pre-existing representation. Alternatively, the primary trace may be selected from the group of traces, either arbitrarily, or based on one or more data quality metrics. The line segments connecting each of the data points comprising the primary trace are bisected 112, and an axis normal to the segment is constructed at each segment midpoint 114. For each other trace representing the road, the points where the trace crosses these normal axes are recorded. Then, a statistical measure is used to calculate a location of a single "corrected" trace point based on all of the traces crossing the normal axis for each line segment 116. In one embodiment, the statistical measure may be a simple arithmetic average of the group of traces. Alternatively, it may be a weighted average, the median, a geometric average, or the like. If a weighted average is used, the weighting factor may be based on the likely error associated with the measurements in the data set upon which each trace is based. The error and associated weight given to a trace may be estimated in one or more of the ways discussed above.

To group data to a road or route, the present invention generally applies one or more metrics to discrete sets of data to identify those that seem to follow the same path for some preset distance of travel. This grouping may be accomplished in one or more ways, such as for example those discussed above or other equivalent alternatives.

FIG. A5 illustrates a simple implementation of this aspect of the present invention. A group of three traces 260, 262, 264 roughly connect points A and B. The trace 260 is selected as the primary trace. A bisector 266 is drawn at the midpoint of each line segment along the primary trace 260. Along each bisector 266, the orthogonal displacement of each of the traces 260, 262, and 264 is calculated and analyzed. Note that trace 260 has by definition a displacement of 0 at each point. Based on analysis of the displacements at each bisector point, a new, corrected data point is calculated at each bisector. Then, the aggregated trace is drawn by connecting these corrected data points.

In an illustrative but non-limiting example of the present invention, input data collected by one or more vehicles traversing a road or a road segment a number of times may produce a collection of data traces representing the path of the road. Data points along these traces may be collected using any kind of position determining and recording device, such as for example a global positioning system transceiver or an equivalent. The exact types of device or devices used to collect data points forming each of the traces in the collection is not important to the operation of the present invention provided that the device or devices provide positional data at some interval of time or motion along the road or route.

Referring now to FIG. 3, a method of identifying paths that diverge from roads indicated on a conventional map database is shown in more detail according to one embodiment of the present invention. FIG. 3 is a description of FIG. A-1 in more detail. The data sets received 310 from devices that record such data, such devices containing a conventional GPS system or other way of identifying position data. In one embodiment, the data sets include data points describing the latitude and longitude of the data points, the date and the time that the data set that the data point was recorded, and may include quality information such as the number of satellites with which the GPS was in communication at the time the data point was recorded. Departure and merge points are identified 312. In one embodiment, departure and merge points are identified by determining whether any of the data points received in step 310 diverged from the roads. In one embodiment, a data point that diverges from a road is one that is in excess of a threshold tolerance distance from the roads of a map database. Data from other devices or from the same device but at a different time that also are outside of the threshold distance from any known road but within a threshold distance from the data points between a departure point and a merge point (the point at which the data points again come within a threshold distance of a road on a map database) or from points between these data points or within a threshold distance of a curve fit to such data points are grouped 314. Other forms of grouping may be employed. In one embodiment, for each departure and merge point, the latitude and longitude, and the road departed from or merged onto is identified as a tuple. Tuples that have the same departure road (the road departed from), and approximately the same latitude and longitude of departure, and the same merge road (the road merged onto), and approximately the same latitude and longitude of merge are identified, and the points corresponding to the tuples, as well as the data points in between the tuples are grouped.

As data is grouped, additional departure and merge points may be identified as points of departure or merging point of departure from or merging onto a path that is identified as described herein.

A first group is selected 316 and data in the first group from a first device and near any same date and time that is part of the first group selected is itself selected 318. Data from the selected device, with a nearby date and time selected is formed into a trace as described herein 320. Functions may be defined between the trace points 322 using conventional curve fitting techniques. A quality level is assigned to the trace 324 as described above.

If there is more data in the group, from a different device or from the same device at a different date and time, 326, a next device, and date and time is selected 328 and the method continues at step 320 using data from the selected device, at approximately that date and time. Otherwise 326, the method continues at step 330. At step 330, if there is a sufficient number of traces in the group, the method continues at step 340. Otherwise 330, the method continues at step 370 of FIG. 3B. It is noted that the determination of whether there are a sufficient number of traces in the group may be made earlier, for example, by moving step 330 below step 318, with the yes branch of step 330 continuing at step 320 and the no branch of step 330 continuing at step 370 of FIG. 3B.

At step 340 a trace with a quality level not lower than any other trace in the group is selected from among the traces of the selected group. The first two points of the selected trace are selected and a bisection or other selection of a location on either of, or between, the two selected data points, is performed 342. A different trace from the group is selected 344 and an identification is made 346 of an intersecting point on the line normal to the bisection point of step 342. The line normal to the bisecting point is perpendicular to the function between the two points at the bisection point. Values are assigned to the intersecting point 348, such as by assigning to the intersection point a value corresponding to the distance from the trace selected at step 340 and the intersection point, and another value corresponding to the quality level of the trace corresponding to the intersection point. If there are more traces in the group not already selected 350, the next trace not already selected is selected 352, and the method continues at step 346. Otherwise 350, if, in the trace selected at step 340, there are more data points 354, the next pair of data points is selected 356. Step 356 includes selecting one of the points previously selected and bisected as described above. The method continues at step 344. The two points selected at step 356 are "bisected" in any manner described herein, and the method continues at step 344.

If at step 354 there are no additional data points in the trace selected in step 340, corrected data points are computed using each point of bisection of the trace selected at step 340 and the values identified at step 348 in the manner described above. The corrected points are assigned 362 a path corresponding to the group. The method continues at step 370 of FIG. 3B.

At step 370 of FIG. 3-D, if there are more groups, the next group is selected 372 and the method continues at step 318 using the selected group. Otherwise 370, in one embodiment, the method terminates 374. The method may be repeated periodically or upon receipt of sufficient data.

Although the data is described as being grouped with the similar departure points from the same departure road, and similar merge points from the same merge road, other more complex groupings may be identified. For example, some off ramps fork or merge. In such embodiment, groupings may be made that have any common point: either a departure or a merge point, with any data in the group, to encompass Y or X shaped paths, or those having a more complicated shape. Data points having a greater than a threshold distance from one another, may then be split into separate groups, and processed as described above.

In another aspect, the present invention provides a method and system for identifying locations where roads that cross one another are not physically and drivably connected. As a non-limiting example of an implementation of this aspect of the invention, a first road may be an over crossing that passes above a second road of an apparent intersection such that a simple left or right turn or other direct connection from the first road onto the second road is not possible. If connections between these two roads are possible, it is likely via one or more connector ramps. In some instances, no connection is possible.

Given a database representation of a road network, some standard assumptions may be made to identify potential locations where roads that cross are not drivably interconnected. For example, many interchanges between limited access roads such as freeways and other, non-limited roads are not simple intersections. In the United States, these connections tend to be made via a complex set of ramps that may not be represented in a road network database. Use of a database that does not accurately reflect the connections between roads for providing driving directions may lead to an unacceptably low level of accuracy in the navigation directions obtained by querying the database.

FIG. B1 is a diagram 400 illustrating one potential hypothetical example of this problem. An arterial north-south road 402 crosses an east-west freeway 404 via an overpass 406. Traffic traveling northbound on the arterial road 402 connects to eastbound lanes on the freeway 404 via a first ramp 410 that exits from the right hand lane of the arterial road 402 at a first departure point 412 and connects to the right hand lane of the freeway 404 at a first connection point 414. Northbound vehicles from the arterial road 402 access westbound lanes on the freeway 404 via a second ramp 416 that exits from the right hand lane of the arterial road 402 at a second departure point 420 north of the first departure point 412. After executing a 270 degree cloverleaf, the second ramp 416 connects to the right hand westbound lane of the freeway 404 at a second connection point 422 to the west of the arterial road 402. Southbound vehicles from the arterial road 402 may access westbound lanes on the freeway 404 via a third ramp 424 that exits from the right-hand lane of the arterial road 402 at a third departure point 426 north of the freeway 404. The third ramp 424 connects to the second ramp 416 at a third connection point 430.

As FIG. B1 further shows, vehicles transitioning from both southbound and northbound directions on the arterial road 402 to westbound on the freeway 404 share the same ramp between the third connection point 430 and the second connection point 422. Similarly, transitions from the eastbound lanes of the freeway 404 to the north and south directions on the arterial road 402 begin on a fourth ramp 432 which departs from the rightmost eastbound freeway lane at a fourth departure point 434. The fourth ramp 432 connects to northbound lanes on the arterial road 402 at a fourth connection point 436 by passing under the arterial road 402 and executing a cloverleaf. West of the arterial road 402, at a fifth departure point 440, a fifth ramp 442 diverts to southbound arterial road lanes to which it connects at a fifth connection point 444. Connections for the westbound direction on the freeway 404 to both directions of the arterial road 402 are accessed via a sixth ramp 446 that departs from the rightmost lane of the freeway 404 at a sixth departure point 450. The sixth ramp 446 connects to the rightmost northbound lane of the arterial road 402 at a sixth connection point 452, which is likely a signal controlled intersection. Traffic from the sixth ramp 446 may access southbound lanes on the arterial road 402 via a seventh segment 454 which signifies a left-hand turn connecting with southbound arterial road lanes at a seventh connection point 456. Finally, Southbound arterial road traffic may access eastbound lanes on the freeway 404 by making a left turn at a eighth departure point 460 and then traversing an eighth ramp 462 that joins the first ramp 410 at an eighth connection point 464. Traffic following the eighth ramp 462 from southbound on the arterial road 402 follows the first ramp 410 along with formerly northbound arterial road traffic between the eighth connection point 464 and the first connection point 414.

This aspect of the present invention provides systems and methods for identifying grade-separated road crossings such as over crossing 406 in FIG. B1. Identification of these features lends context to and clarifies interpretations of other position and trajectory data collected in the course of creating and/or improving a navigable database. Especially in cases with simpler interconnections than those shown in FIG. B1, or in the most extreme case where there are no interconnections between roads that cross at different elevations, this aspect of the present invention is invaluable in correcting potentially erroneous navigation instructions that could be generated form the uncorrected database.

In one embodiment of this aspect of the present invention, roads in a road network that are identified as limited access roads, such as for example freeways, are presumed to require non-simple connections for vehicles to move between them and other roads in the network. On the other end of the connectivity spectrum, minor surface streets that cross each other may be presumed to be readily interconnected through simple turns. Difficulties may arise, however, for major arterial roads that cannot be accurately represented as limited access roads. For example, in the city of Palo Alto, Calif., one such road is San Antonio Road 468, which crosses U.S. Route 101 at an overpass 470 and passes west through Palo Alto and into the town of Los Altos before reaching a junction with Foothill Expressway 472 as shown on the map in FIG. B2. For much of this distance, San Antonio Road may be characterized as a simple surface street—connections to other roads that cross it, such as Charleston Road 474 and El Camino Real 476 occur as surface (as opposed to grade separated) crossings. These intersections are well-represented by simple turns. However, where San Antonio Road over crosses the Central Expressway 480, this intersection is characterized by a series of ramps. A vehicle may not transition between these two roads simply by making a left or a right turn. At the crossing point, San Antonio Road is carried on an overpass that is approximately 10 meters above the road grade of the Central Expressway. The present invention provides a method and system for identifying these instances of elevation-separated road interchanges that may be advantageously used to improve drivability database representations of road networks.

In general, the changes in elevation of a roadway may be determined by a number of methods. In one example, vertical position data may be provided by one or more GPS transceivers collecting data while traversing a first road near a crossing point between the first road and a second road. GPS accuracy for elevation readings is generally poor due to the relatively low probability of there being a satellite close to directly overhead of the transceiver traversing the first road. As such, merely comparing a vertical position fix obtained while traversing the first road at or near the crossing point with a vertical position fix obtained from a second vehicle with a second transceiver while the second vehicle traverses the second road at or near the crossing point is unlikely to provide sufficient vertical position accuracy to permit resolution of the vertical displacement, if any, between the first and the second roads. In other words, the error in vertical position measurements is likely to exceed the typical vertical displacement between crossing roads in a grade separated crossing. For this reason, according to this aspect of the present invention it is advantageous to use the rate of change in elevation, or alternatively the second derivative of elevation (rate of change of the slope) as the metric for identifying grade separated crossings.

FIG. B3 is a chart that shows exemplary vertical position data collected by traversing San Antonio Road between U.S. Route 101 in Palo Alto and the town of Los Altos in both directions with a GPS transceiver. As shown, the data exhibit two substantially rapid gradient changes over the course of the distance traveled. Both of these rapid changes include a rapid positive gradient change followed quickly by a rapid negative gradient change. These two incidents correspond in position to an over-crossing over U.S. Route 101 and an over-crossing over the Central Expressway, respectively.

While it is advantageous to evaluate the vertical gradients of both the first and the second of two crossing segments as each approaches and moves away from the crossing, the present invention may be also used to identify grade separated crossings using gradient data from only one of the crossing segments in concert with a reasonably accurate assessment of the position (in the X-Y axis) of the second road relative to the first segment.

FIG. B4 shows a flowchart 500 illustrating the steps of a method according to one embodiment of this aspect of the present invention. In general, elevation vs. distance traveled or alternatively elevation vs. position data are collected for travel along a first road that crosses a second road 502. A metric of the change in elevation along the road is calculated for each point along the road 504. This metric may be the first derivative of the elevation vs. distance traveled or absolute position, the second derivative of the elevation vs. distance traveled or absolute position, or some other comparable metric. The metric is then compared to a threshold value 506. This comparison may be done at all points along the road, at some interval along the road, or advantageously in the vicinity of a crossing point where the first road crosses a second road. If the absolute value of the metric exceeds the threshold within a predetermined distance from the crossing, the crossing is identified as a grade separated crossing 510. Optionally, this process may be repeated with elevation data for travel along the second road in the vicinity of the crossing point.

In a further embodiment, the trace aggregation methods and systems described above may be employed prior to the determination of the road gradients approaching and moving away from the intersection of the first and the second roads. In this embodiment, aggregation of multiple traces along a road is performed in two planes—the horizontal, and the vertical. The horizontal data are processed as discussed above—a primary trace is selected, and the segments of the trace are bisected. At each bisection point, an axis is constructed orthogonal to the tangent of the primary trace at the bisection point. The horizontal displacement of each trace in the group of traces to be aggregated is evaluated along each of these orthogonal axes. The points along each of the bisecting axes are processed to determine a new, corrected point for the aggregated trace. The processing could be a simple averaging, a weighted averaging, or some more complex mathematical function. The choice of function in this case is one that is within the level of ordinary skill in the art.

Once the horizontal aggregating has been completed, the vertical dimensions of the traces may be aggregated in the same manner. In the simplest implementation, the z-axis (vertical) dimension of each data point in a primary trace is connected to form a vertical trace vs. distance along the aggregated horizontal trace. Then, each segment in the primary trace is bisected and an axis orthogonal to the tangent of the primary trace at the bisection point is constructed. The vertical displacement of all of the traces at the bisection axes are processed to determine an aggregate vertical position for each bisection point. The aggregated vertical positions are connected to form the aggregated trace. This trace is then processed as described above—the first and/or second derivative of the trace altitude is calculated and analyzed in the vicinity of cross streets. Substantial changes in one or more of these metrics indicate that a grade separated crossing may be present. If this is the case, the resultant drivability database does not allow simple connections between the two crossing roads to avoid "false positives" in the directions it provides in response to navigation queries.

As noted above, the method of the present invention may be used to identify road crossings that occur at different heights (also known as grades). Referring now to FIG. 3C, a method of identifying road crossings that occur at different grades is shown according to one embodiment of the present invention. FIG. 3C operates in manner similar or identical to FIG. 3A, with steps labeled identically being performed in the manner similarly to the corresponding step of FIG. 3A, and steps labeled with the suffix "C" either adding to or replacing a step in FIG. 3A. In such embodiment, the data sets received in step 310 include height information. Road crossings are identified 312C and the data is segregated 314C into groups occurring at or near road crossings, with each group corresponding to travel along a single road. Thus, data for a crossing involving two roads is grouped into two different groups. Such grouping may be performed at step 314C as shown, or a single group may be used for the crossing, with the traces separated into two or more groups after the traces are identified, for example between the no branch of step 326 and step 330C. The function identified in step 322C is identified using the heights, and need not include the latitude and longitude. Step 330C involves detecting whether a sufficient number of traces exist for each of every road in the group. For example, in one embodiment, there must be at least three traces for each road in the group, or the "no" branch is taken.

The roads for each crossing are selected and processed one at a time. Thus, step 338C selects one of the roads from the group. The trace is selected in step 340C in the same manner as step 340, except that the selection is made from the traces corresponding to the road selected in step 338C. Bisection of the two points at steps 342C and 356C is performed using the function identified using the heights. At least one of the values assigned at step 348 is a function of the height of the selected other trace.

Referring now to FIG. 3D, the method illustrated in FIG. 3C continues. If there are more roads in the group 358C, the next road is selected 360C and the method continues at step 340. Using the selected row. If there are no more roads in the group 358C, corrected points are computed for each of the roads as described above using the heights and optionally quality levels 362C. For each road, the second derivatives are identified and a determination is made as to whether the second derivative exceeds a threshold, or whether the sum of the second derivatives exceeds a threshold and the slopes of at least some of the roads are different in the direction of the crossing 364C.

If the sum exceeds a threshold and the slopes are different as the roads approach the crossing, or any of the second derivatives exceeds a threshold 366C the method continues at step 368C. Otherwise 366C, the roads are identified as crossing at the same grade and the method continues at step 370C. At step 368C, the roads are identified as crossing at different grades, and the higher or lower road may be identified using the derivative of the heights or the heights 369C. The method continues at step 370C.

FIG. 6 is a block schematic diagram of a system for detecting paths of travel, according to one embodiment of the present invention. Referring now to FIG. 6, at any time, data set receiver 610 may receive data sets from a server (not shown), collected from devices as they travel, for example in an automobile. The data set includes any number of data point records, where each data point record includes a set of latitude and longitude coordinates, a device identifier of the device that obtained the coordinates, a date and time that the coordinates were obtained, and optionally quality information as previously described, such as the number of satellites from which the coordinates were obtained. When data set receiver 610 receives the data set, data set receiver 610 stores the data set in data set storage 612, in one embodiment overwriting the oldest previous information, and signals group manager 620. In one embodiment, data set storage 612 includes a conventional database.

When so signaled, group manager 620 locates the data set in data set storage 612 and, for each data point record, matches the coordinates in the data point record with coordinates stored in map database 618. In one embodiment, map database 618 includes a conventional GIS database, including the coordinates of known roads. In one embodiment, if group manager 620 finds that all the coordinates in the data point records stored in data set storage 612 fall within a first threshold distance of the coordinates of known roads in map database 618, or in one embodiment that no more than a predetermined small number of the coordinates, e.g. five sets of coordinates, fall outside the threshold distance, group manager 620 takes no further action until signaled again by data set receiver 610. In one embodiment, the first threshold distance is the distance that measurements of the latitude and longitude of a device could normally be expected to deviate from the road while the device is on, or at the side of, the road.

Otherwise, if group manager 620 finds any coordinates in data point records that do not correspond to the coordinates of a known road in map database 618, group manager 620 compares those coordinates to any coordinates of known paths stored in path storage 672. In one embodiment, path storage 672 includes a conventional database into which path information is stored as described in more detail below. If group manager 620 finds that all the coordinates in the data point records stored in data set storage 612 fall within the first threshold distance of the coordinates of known paths in path storage 672, or in one embodiment that no more than a predetermined small number of the coordinates, e.g. five sets of coordinates, fall outside the first threshold distance, group manager 620 takes no further action until signaled again by data set receiver 610.

Otherwise, group manager 620 sorts into groups all the data point records that include coordinates corresponding neither to a known road nor to a known path, hereinafter referred to as "unmatched" data point records. Each group will include data point records collected from any number of devices that traveled the same path, at the same or at different times. There are many different ways of constructing such groups. In one embodiment, to sort the data point records into groups, group manager 620 selects the first unmatched data point record, and also selects the device identifier and the time and date included in that data point record. Group manager 620 finds the data point record in the data set that includes the same device identifier, and that also includes a time and date that most closely precedes the selected time and date. If that data point record is also an unmatched data point record, group manager 620 finds the next most closely preceding data point record. Group manager 620 continues searching through the data point records corresponding to the selected device identifier in reverse chronological order, until group manager 620 finds the data point record that most closely precedes the selected data point record and that also matches a known road or a known path. Group manager 620 determines that the coordinates of that data point record represent the departure point of the first group, and that the time and date of that data point record represent the departure time.

Group manager 620 also finds the merge point of the first group. To do so, group manager 620 finds the data point record in the data set that includes the selected device identifier, and also includes the time and date most closely following the selected time and date. If that data point record is also an unmatched data point record, group manager 620 finds the next most closely following data point record. Group manager 620 continues searching through the data point records corresponding to the selected device identifier in chronological order, until group manager 620 finds the data point record that most closely follows the selected data point record and that also matches a known road or a known path. Group manager 620 determines that the coordinates of that data point record represent the merge point of the first group, and that the time and date of that data point record represent the merge time.

In this embodiment, when group manager 620 has identified a departure point and a merge point, group manager 620 creates a group record including the coordinates of the departure point and the merge point. Group manager 620 also includes in the group record pointers to each data point record in data set storage 612 that correspond to the selected device identifier and that include times and dates that fall between the departure time and the merge time. Group manager 620 determines that those data point records are now matched data point records.

When group manager 620 has created the group record, group manager 620 selects the next unmatched data point record, and repeats the process described above to determine the departure point and departure time, and the merge point and merge time, of the device corresponding to the newly selected data point record. Group manager 620 compares the newly determined departure point and merge point to the departure points and merge points of any previously created group records. If the departure points and merge points match, or in one embodiment if the coordinates of such points fall within a predetermined distance of each other, such as within a quarter of a mile, group manager 620 adds, to that matching group record, pointers to the data point records corresponding to the newly selected device identifier and falling between the newly determined departure time and merge time. Otherwise, if the newly determined departure and merge points do not match those of any previously created group records, group manager 620 creates a new group record that includes pointers to the data point records corresponding to the newly selected device identifier and falling between the newly determined departure time and merge time. Group manager 620 determines that those data point records are now matched data point records.

Group manager 620 repeats the process described above until each data point record has been matched.

When group manager 620 has matched the data point records to group records, in one embodiment, in order to eliminate spurious data or instances in which a car briefly veers off a road, group manager 620 determines whether the group records qualify for analysis. In one embodiment, a group record qualifies for analysis if it includes pointers to more than a predetermined number of data point records, for example more than five data point records, and if those data point records collectively include more than a predetermined number of different device identifiers, for instance more than two different device identifiers. In this embodiment, group manager 620 discards any group records that do not qualify for analysis. Therefore, in this embodiment, new paths will not be identified unless several devices have traveled the path and provided a sufficient amount of information. Group manager 620 provides any group records that qualify for analysis to trace formation manager 630.

When trace formation manager 630 receives the group records, trace formation manager 630 in one embodiment deletes any information stored in trace storage 632. Trace formation manager 630 also selects the first group record and traces the route traveled by each device included in the group. To trace the route, trace formation manager 630 selects the first data point record to which a pointer is included in the group record. Trace formation manager 630 selects the device identifier, and the date and time, included in that data point record. Trace formation manager 630 also finds all other data point records in the group that include the same device identifier along with dates and times that, when the selected date and time is included, form a contiguous set of dates and times. Two sets of dates and times may be considered contiguous as long as they fall within a predetermined amount of time of each other, for example within one minute. Trace formation manager 630 determines that those data point records form a single route.

Optionally, if trace formation manager 630 does not find at least a predetermined number of data point records in the route, for example three, trace formation manager 630 discounts those data point records and proceeds as described below.

Otherwise, when trace formation manager 630 has found all the data point records in the route, trace formation manager 630 creates a trace record including, for each such data point record, a pointer to that data point record, and also a function, fit by conventional curve fitting techniques, that traces a line or a curve from the coordinates in that data point record to the coordinates in one or more other adjacent data point records included in the trace record. In one embodiment, trace formation manager 630 also includes in the trace record an indication of the direction of travel, which trace formation manager 630 determines by comparing the times and the coordinates associated with the first and last data point records. Trace formation manager 630 stores the trace record in trace storage 632. In one embodiment, trace storage 632 includes a conventional database.

When trace formation manager 630 has stored the trace record in trace storage 632, or when trace formation manager 630 has discounted the data point records as described above, if any data point records remain in the selected group record that have not been either discounted or included in a trace record, trace formation manager 630 selects the device identifier, and the date and time, included in the next data point record, and creates a new trace record for all data point records corresponding to that device and a contiguous set of dates and times. It is noted that, because the same device may travel the same route at different times, it is possible for multiple trace records to be created that include data point records associated with the same device identifier but with different sets of dates and times.

When trace formation manager 630 has either discounted or created a trace record for each route traveled by each device included in the group, and saved the trace records in trace storage 632, if at least a predetermined number of trace records were created and stored in trace storage 632, for example at least three trace records, trace formation manager 630 signals quality assignment manager 640, which proceeds as described below.

If trace formation manager 630 determines that fewer than the required number of trace records were stored in trace storage 632, or when trace formation manager 630 is signaled by path manager 670 as described below, trace formation manager 630 deletes any trace records in trace storage 632, selects the next group record received from group manager 620, and repeats the process of creating and storing trace records using the newly selected group record. If no more group records exist, in one embodiment trace formation manager 630 takes no further action until another set of group records is received from group manager 620.

When signaled by trace formation manager 630 as described above, quality assignment manager 640 assigns a quality rating to each trace record in trace storage 632. To assign the quality rating, in the embodiment that data point records include quality information as described above, quality assignment manager 640 uses the quality information included in the data point records for that trace record. In one embodiment, the quality rating corresponds to the number of satellites with which the device was in communication at the time the coordinates were obtained. Because it is possible that the device may have dropped or gained satellite communication at different points along the route, in one embodiment, quality assignment manager 640 assigns the trace record a rating corresponding to the lowest of the qualities indicated by the data point records. In another embodiment, quality assignment manager 640 might assign a rating corresponding to an average of those qualities.

In the embodiment that data point records do not include quality information, quality assignment manager 640 may obtain the quality information from another source. For example, in one embodiment, a server (not shown) may keep a log of the number of active satellites at varying times, and the server may periodically provide these communication logs to satellite quality recorder 614. In this embodiment, when satellite quality recorder 614 receives the communication logs, satellite quality recorder 614 stores the communication logs in satellite quality storage 616. Furthermore, in this embodiment, to assign the quality rating to the trace record, quality assignment manager 640 finds the dates and times and the device identifier of the data point records in the trace record, and uses the communication logs in satellite quality recorder 614 to determine the number of satellites with which that device may have been in communication at those dates and times. In this embodiment, quality assignment manager 640 assigns the trace record a quality rating corresponding to those numbers, for example the average of the numbers, as described above.

When quality assignment manager 640 has assigned a quality rating to each trace record stored in trace storage 632, quality assignment manager 640 signals primary trace selector 650. When so signaled, primary trace selector 650 selects the trace record in trace storage 632 to which the highest quality rating has been assigned. Primary trace selector 650 determines that trace record to be the primary trace record. In the embodiment that trace records include an indication of the direction of travel, as described above, if the trace records in trace storage 632 have different direction of travel, primary trace selector 650 selects a primary trace record for each direction of travel. Primary trace selector 650 provides a pointer or pointers to the primary trace record(s) to primary trace bisector 652.

When primary trace bisector 652 receives the pointer(s), primary trace bisector uses the first pointer to find the primary trace record in trace storage 632, and selects the first two data point records to which pointers are included in that trace record. Primary trace bisector 652 uses the pointers to find those data point records in data set storage 612. Primary trace bisector 652 uses the coordinates included in the data point records, along with the functions included in the trace record and associated with those data point records, to determine the coordinates and the function of a normal axis bisecting the primary trace between those two coordinates. For example, if the first data point record includes one set of coordinates, and the second data point record includes the coordinates of a spot one hundred yards due north of those coordinates, and the function associated with those data points traces a straight north-south line, then primary trace bisector 652 will determine that the normal axis should be a straight east-west line that intersects the trace between the selected data points at a point fifty yards due north of the coordinates included in the first data point record.

When primary trace bisector 652 has determined the function and location of the normal axis, primary trace bisector 652 provides that information to normal point assignor 660. In one embodiment, primary trace bisector 652 also provides normal point assignor 660 with the direction of travel of the primary trace record.

When normal point assignor 660 receives the information describing the normal axis, and optionally the direction of travel, normal point assignor 660 identifies the points at which the normal axis would intersect each of the traces defined by the trace records in trace storage 632. In the embodiment that normal point assignor 660 received a direction of travel, normal point assignor 660 identifies intersecting points only for the trace records that include the same direction of travel.

In one embodiment, normal point assignor 660 assigns values to those intersecting points based on the quality ratings assigned to the trace records. Normal point assignor 660 also computes a corrected point along the normal axis, optionally using the assigned values, as will now be described.

FIG. 7 is an illustration of three traces intersected by a normal axis, according to one embodiment of the present invention. Traces 0, 1, 2 are intersected by the normal axis at intersection points A, B, C. In order to compute a corrected point along the axis, in one embodiment, normal point assignor 660 averages the positions of the intersection points along the normal axis, and places the corrected point at the average position. In this example, the corrected point might be placed slightly to the right of intersection point B, as indicated by point E.

In another embodiment, normal point assignor 660 first assigns values to the intersection points. For the sake of example, assume that trace 0 has been assigned a quality rating of 10, trace 1 has been assigned a quality rating of 6, and trace 2 has been assigned a quality rating of 1. In this example, normal point assignor 660 would therefore assign a value of 10 to intersection point A, a value of 6 to intersection point B, and a value of 1 to intersection point C. In this embodiment, in order to compute the corrected point, normal point assignor 660 weights the positions of the intersection points according to their quality. In this example, because the value of intersection point C is low and the value of intersection point A is high, the corrected point might be placed to the left of intersection point B, as indicated by point F.

Referring again to FIG. 6, when normal point assignor 660 has computed the corrected point, normal point assignor 660 signals primary trace bisector 652. When so signaled, primary trace bisector 652 uses the second and third data point records included in the primary trace record to determine the coordinates and the function of a new normal axis bisecting the next segment of the primary trace. Primary trace bisector 652 provides this information to normal point assignor 660, which identifies intersecting points for each of the traces in trace storage 632 and computes a corrected point along the new normal axis as described above, and then again signals primary trace bisector 652.

The process of bisecting the primary trace, comparing the bisecting normal axis to other traces, and computing corrected points along that axis continues thereafter until no more data point records, and therefore no more trace segments, remain in the primary trace record. At that point, primary trace bisector 652 provides an indication to normal point assignor 660 that no more trace segments remain in the primary trace record.

When normal point assignor 660 receives the indication that no more trace segments remain in the primary trace record, normal point assignor 660 provides the coordinates of all the corrected points to path manager 670, which proceeds as described below.

Additionally, if primary trace bisector 652 received a pointer to another primary trace record for a different direction of travel from primary trace selector 650 as described above, primary trace bisector 652 selects the next primary trace record, and primary trace bisector 652 and normal point assignor 660 repeat the process described above of determining the normal axis and computing corrected points, using the newly selected primary trace record and other trace records corresponding to the same direction of travel.

When path manager 670 receives the corrected point coordinates from normal point assignor 660 as described above, path manager 670 creates a new path record in path storage 672. In one embodiment, path storage 672 includes a conventional database. Path manager 670 assigns a unique identifier to the path record, and includes in the path record the coordinates of each of the corrected points. When path manager 670 has created and stored the path record, path manager 670 signals trace formation manager 630, which repeats the process of creating trace records for analysis, using any additional group record as described above.

Identifying Overpasses and Underpasses

In one embodiment, the system described above can be used to identify road crossings that may appear on a map as intersections, but that are actually overpasses or underpasses. In this embodiment, the system shown in FIG. 6 works as described above, except that when data sets are received by data set receiver 610 and stored into data set storage 612 as described above, each data point record contained in the data set includes an elevation as well as latitude and longitude coordinates. In addition, when group manager 620 creates group records after matching the coordinates of each data point record with the map information stored in map database 618 as described above, instead of grouping data point records that do not match known roads or known paths, group manager 620 groups data point records that match road crossing locations. As described above, group manager 620 includes pointers in each group record to each data point record in data set storage 612 determined to be part of the group, and provides the group records to trace formation manager 630.

In this embodiment, after trace formation manager 630 has created trace records defining the route traveled by each device included in the first group, and stored the trace records in trace storage 632 as described above, and after quality assignment manager 640 has assigned quality ratings to each trace record, quality assignment manager 640 signals second derivative identifier 680.

Second derivative identifier 680 uses the trace records stored in trace storage 632 to identify, for each record in the group, the slope of the road crossing in each direction, for example by comparing the differences in elevation between successive data point records included in a trace record and determining that the rate of change in elevation is the slope. In one embodiment, because the elevations included in the data point records may not be sufficiently accurate, second derivative identifier 680 also identifies the rate of change of the slope for each device, for example by comparing slopes between successive data point records. In one embodiment, second derivative identifier 680 identifies the rates of change in slope, which may be positive or negative, for each trace record corresponding to the same direction of travel (i.e. on the same road), and takes the average of these rates, optionally giving greater weight to information from trace records that were assigned high quality ratings. Second derivative identifier 680 provides the average rate of change in slope for each direction of travel, along with at least one of the sets of coordinates, to different grade crossing identifier 684.

When different grade crossing identifier 684 receives the coordinates and rates of change, different grade crossing in slope for either direction is greater than a predetermined threshold, typically the threshold that would normally be necessary in order for a road to pass over or under another road. Additionally or alternatively, different grade crossing identifier 684 may compare the rates of change in slope in all directions, for example because a gradual incline in a north-south direction and a gradual decline in an east-west direction might together indicate that the intersection is actually an overpass and underpass, while the change in elevation in each direction alone might not surpass the threshold. If the change in slope in either or both directions is greater than the threshold, different grade crossing identifier 684 uses the coordinates received from second derivative identifier 680 to find the crossing in map database 618, and different grade crossing identifier 684 adds metadata to map database 618 indicating that the crossing is an overpass (if the rate of change is positive) or an underpass (if the rate of change is negative). When different grade crossing identifier 684 has completed the comparison and added any metadata to map database 618, different grade crossing identifier 684 signals trace formation manager 630, and the process repeats for the next group record.

An experiment was conducted according the method and system of the present invention. This exemplary implementation of one possible embodiment of the present invention is intended for illustration purposes only, and is not intended to limit the scope of the present invention in any way.

This experimental example involves use of the systems and methods of the present invention to analyze and apply road trace data to update and original map database to reflect changes in road geometry and/or connectivity resulting from construction of new interchange elements.

FIG. C1 shows an unmodified map in the area chosen for this example: the US-101 and CA-85 interchange in Mountain View, Calif. This interchange is currently under construction, however, the applied updates described in this example are believed to represent the final state of the corresponding roads. The minor roads in the area are suppressed to simplify the depiction.

FIG. C2 shows a further simplification of the map data in the area. All ramps have been removed. As with most ramps shown in FIG. C1, the curved connections between US-101 and CA-85 (A & B) have been replaced during construction. This discussion will focus on the updating of connection A and some of the other affected 101 South ramps.

FIG. C3 shows two GPS traces derived from a sample of data collected using one of the methods described above. Through application of trace analysis and aggregation methods according to various aspects and embodiments of the present invention, these traces have been determined to represent specific features of the flow of traffic. One trace represents the flow of traffic on US-101 in the third lane from the left. The other trace represents flow in the next lane to the right of the third lane that eventually exits onto CA-85 South.

FIG. C4 shows a schematic representation of the US-101 South lanes in the area of the exit showing the paths of the two selected traces. FIG. C5 shows the same two GPS traces, only zoomed-in on the area that requires updating (shaded oval in FIG. C1). At this level of magnification, the divergence between the geometry of the two traces and the shape and structure of the original map data is visible. This divergence is a direct result of the construction.

FIG. C6 shows a further zoomed-in view of the two GPS traces in the area of the curved section of US-101 just west of Shoreline. The trace representing the lane that is third from the left is the one that closely matches the original US-101 South map data. The trace representing the next lane is offset by several meters, as expected. The scale bar in the lower left corner of FIG. C6 is 10 meters long. FIG. C7 shows a view of the same two traces at the Shoreline over crossing of US-101. Beginning at location C, the third-lane (upper) diverges substantially from US-101 South map data. This is because the construction has widened the course of US-101 to make room for carpool ramps (thus far incomplete) in the center median. Lanes in both directions are shifted right.

FIG. C8 shows further progress south on US-101. The two traces track closely with each other up until location D, at which point they begin to diverge. This point roughly represents the new location of the exit from US-101 onto CA-85 South. Location E is the position of the exit in the original map data, about 175 meters further south on US 101, which is approximately 6-7 seconds of travel time at freeway speeds.

FIG. C9 shows a slightly zoomed-out picture of additional interesting sections of the two traces. After divergence point D, the two traces remain separated from their corresponding map data elements for several hundred meters until they gradually converge back to the old course of the road. These convergence points are the limits of the effect of the construction.

FIG. C10 picture returns to the view in FIG. C8, showing a mid-point in the map data updating process. Note how the course of US-101 South and its exit to CA-85 South have been revised to match the structure and shape of the GPS traces. The original (old) representation of the freeway and exit are now out of date and are marked for deletion. Locations D & E are as shown in FIG. C8.

FIG. C11 shows the complete area of this map data update. Noted locations are the US-101 South course divergence point C (from FIG. C7), the new US-101 South to CA-85 South exit point D, and the old US-101 South to CA-85 South exit point E, and the locations where the new representations converge back to road locations in the original map (roads that have not changed location).

FIG. C12 shows the final state of this section of US-101 South and the new exit to CA-85 South. The out-of-date map data elements are removed. FIG. C13 shows a collection of "composite" GPS traces that represent some of the adjacent US-101 South ramps that have been created or modified by the construction. FIG. C14 shows the set of new ramp elements that were derived from those GPS traces.

FIG. C15 shows a zoomed-in view of some of the connectivity details for the new ramps. Each three-way intersection in this view forms a connection. All four-way intersections shown in this view do not connect. This includes the location marked by F, which is a where the entrance ramp from Shoreline to US-101 South over-crosses the exit to CA-85. FIG. C16 shows one new connection in the studied interchange that is infrequently used. It allows travel from Shoreline Northbound onto CA-85 South, a path that is not directly provided by the other ramp elements. GPS trace data for this connection was not collected for this example, but the ramp is indicated as a dashed line for completeness.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. A method for identifying geometric features of a road, comprising the steps of:
   constructing a plurality of traces from a plurality of data sets, the data sets comprising periodic positional fixes along the road, the constructing comprising sequentially connecting the positional fixes in each set of the plurality of data point sets with line segments;
   assigning a quality rating to each trace;
   selecting a primary trace from the plurality of traces;
   identifying a midpoint of each line segment in the primary trace;
   constructing a normal axis at each midpoint;
   calculating the point on each axis where each of the plurality of traces crosses each axis;
   aggregating the crossing points on each axis and calculating a corrected trace point for each axis; and
   connecting the corrected trace points to form a correct trace representing the road.

2. The method of claim 1, further comprising the steps of:
   selecting a different primary trace from the plurality of traces and repeating the steps of claim 1.

3. The method of claim 1 wherein one or more of the plurality of data point sets comprises position fixes obtained at a fixed or variable interval along the first road.

4. The method of claim 1, further comprising the step of comparing the vertical gradient of the first road at or near a position where the first road crosses a second road to determine whether the first and the second roads comprise a grade separated crossing.

5. A method of claim 1 for identifying grade separated crossings between a first road and a second road that form a crossing, comprising the steps of:
   evaluating a metric of the elevation gradient for the first road near the crossing;
   comparing the metric a threshold value; and identifying the crossing as a grade separated crossing if the absolute value of the metric exceeds the threshold value.

6. The method of claim 5, wherein the metric is the first derivative of elevation relative to position on the road.

7. The method of claim 5, wherein the metric is the second derivative of elevation relative to position on the road.

* * * * *